(12) United States Patent
An et al.

(10) Patent No.: US 12,360,561 B2
(45) Date of Patent: Jul. 15, 2025

(54) FOLDABLE ELECTRONIC DEVICE INCLUDING FLEXIBLE DISPLAY

(71) Applicant: SAMSUNG ELECTRONICS CO., LTD., Suwon-si (KR)

(72) Inventors: Jungchul An, Suwon-si (KR); Sangkyu Kim, Suwon-si (KR); Bowon Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/655,477

(22) Filed: May 6, 2024

(65) Prior Publication Data
US 2025/0028361 A1    Jan. 23, 2025

Related U.S. Application Data

(63) Continuation of application No. PCT/KR2024/004838, filed on Apr. 11, 2024.

(30) Foreign Application Priority Data

Jul. 20, 2023 (KR) .................. 10-2023-0094943
Aug. 30, 2023 (KR) .................. 10-2023-0114988

(51) Int. Cl.
*G06F 1/16* (2006.01)
*G06F 3/046* (2006.01)

(52) U.S. Cl.
CPC .......... *G06F 1/1641* (2013.01); *G06F 1/1652* (2013.01); *G06F 1/1656* (2013.01);
(Continued)

(58) Field of Classification Search
CPC .... G06F 1/1641; G06F 1/1652; G06F 1/1656; G06F 3/046; G06F 2203/04102; G06F 2203/041
See application file for complete search history.

(56) References Cited

U.S. PATENT DOCUMENTS 5,748,122 A * 5/1998 Shinagawa ............. G06T 9/005
                                                     341/51
11,592,876 B2   2/2023 Kim et al.
(Continued)

FOREIGN PATENT DOCUMENTS

KR      20210083970 A     7/2021
KR      10-2022-0049066   4/2022
(Continued)

OTHER PUBLICATIONS

Search Report and Written Opinion dated Aug. 5, 2024 issued in International Patent Application No. PCT/KR2024/004838.

*Primary Examiner* — Patrick F Marinelli
(74) *Attorney, Agent, or Firm* — Nixon & Vanderhye, P.C.

(57) ABSTRACT

A foldable electronic device includes: a housing including a first housing and a second housing part, a flexible display including a first display region, a second display region, and a third display region, a first layer including an electromagnetic induction panel disposed below the first display region, a second layer contacting the second display region, a first magnet, and a second magnet. The second layer includes a shielding member comprising a shielding sheet disposed between the second magnet and a portion of the electromagnetic induction panel, and a waterproof member comprising a waterproof material at least partially surrounding the shielding member.

20 Claims, 15 Drawing Sheets

(52) U.S. Cl.
CPC .... *G06F 3/046* (2013.01); *G06F 2203/04102* (2013.01); *G06F 2203/04107* (2013.01)

(56) References Cited

U.S. PATENT DOCUMENTS

| | | | |
|---|---|---|---|
| 11,592,951 B2 * | 2/2023 | Kishimoto | H10K 50/87 |
| 12,069,798 B1 * | 8/2024 | Hand | H05K 1/024 |
| 12,169,423 B2 * | 12/2024 | An | G06F 1/1643 |
| 2018/0033571 A1 * | 2/2018 | Choi | G06F 1/1671 |
| 2022/0210933 A1 * | 6/2022 | Park | B32B 27/065 |
| 2023/0046690 A1 | 2/2023 | Park et al. | |
| 2023/0047246 A1 * | 2/2023 | An | H05K 5/06 |
| 2023/0048823 A1 * | 2/2023 | Cho | H04M 1/0216 |
| 2023/0051260 A1 * | 2/2023 | An | H04M 1/02 |
| 2023/0180413 A1 * | 6/2023 | An | G06F 3/041 |
| | | | 345/905 |
| 2023/0229194 A1 * | 7/2023 | Kishimoto | G06F 1/1681 |
| | | | 361/679.01 |
| 2024/0014198 A1 * | 1/2024 | Shin | H10K 50/844 |
| 2025/0028361 A1 * | 1/2025 | An | G06F 1/1656 |

FOREIGN PATENT DOCUMENTS

| | | |
|---|---|---|
| KR | 10-2022-0054486 | 5/2022 |
| KR | 10-2023-0023145 | 2/2023 |
| KR | 10-2023-0023166 | 2/2023 |
| KR | 20230023166 A | 2/2023 |
| KR | 20230023287 A | 2/2023 |
| KR | 10-2023-0080289 | 6/2023 |
| KR | 20230086464 A | 6/2023 |
| KR | 20240054830 A | 4/2024 |

\* cited by examiner

FOLDABLE ELECTRONIC DEVICE INCLUDING FLEXIBLE DISPLAY

CROSS-REFERENCE TO RELATED APPLICATIONS

This application is a continuation of International Application No. PCT/KR2024/004838 designating the United States, filed on Apr. 11, 2024, in the Korean Intellectual Property Receiving Office and claiming priority to Korean Patent Application Nos. 10-2023-0094943, filed on Jul. 20, 2023, and 10-2023-0114988, filed on Aug. 30, 2023, the disclosures of each of which are incorporated by reference herein in their entireties.

BACKGROUND

Field

The present disclosure relates to a foldable electronic device including a flexible display.

Description of Related Art

As demand for a highly portable electronic device increases, the electronic device may include a deformable display. The deformable display may be referred to as a flexible display including a flexible portion that may be at least partially bent. The flexible display may include a portion to be electrically connected to a display driver integrated circuitry. The flexible display may include a plurality of layers.

An electronic device including the deformable display may include housing parts rotatably connected to each other. The housing parts may maintain a folded state through attraction between magnets.

The above-described information may be provided as a related art for the purpose of helping to understand the present disclosure. No claim or determination is raised as to whether any of the above-described information may be applied as a prior art related to the present disclosure.

SUMMARY

According to an example embodiment, a foldable electronic device is provided. The foldable electronic device may comprise: a housing, a flexible display, a first layer, a second layer, a first magnet, and a second magnet. The housing may include: a first housing part and a second housing part configured to be rotatable with respect to the first housing part, about a folding axis. The flexible display may include: a first display region, a second display region, and a third display region. The first display region may include an active area forming at least a portion of a front surface of the housing. The second display region may be disposed opposite to the first display region. The second display region may be spaced apart from the first display region. The third display region may connect the first display region and the second display region. The third display region may be bendable. The first layer may include an electromagnetic induction panel disposed below the first display region. The second layer may be in contact with the second display region between the first layer and the second display region. The first magnet in the first housing part may be disposed below the flexible display. The second magnet in the second housing part may be disposed below the flexible display. The second magnet may be configured to be paired with the first magnet to maintain a folded state of the foldable electronic device. The second layer may include a shielding member comprising a sheet (e.g., a shielding sheet) and a waterproof member comprising a waterproof material. The shielding member may be disposed between the second magnet and a portion of the electromagnetic induction panel positioned above the second magnet. The waterproof member may at least partially surround the shielding member.

According to an example embodiment, a display device is provided. The display device may comprise: a flexible display, a first layer, and a second layer. The flexible display may include a first display region, a second display region, and a third display region. The first display region may include a plurality of pixels. The second display region may be disposed opposite to the first display region. The second display region may be spaced apart from the first display region. The third display region may connect the first display region and the second display region. The third display region may be bendable. The first layer may include an electromagnetic induction panel disposed below the first display region. The second layer may be in contact with the second display region between the first layer and the second display region. The second layer may include a shielding member comprising a sheet (e.g., a shielding sheet) disposed below the electromagnetic induction panel, and a waterproof member comprising a waterproof material at least partially surrounding the shielding member.

According to an example embodiment, a foldable electronic device is provided. The foldable electronic device may comprise: a housing, a flexible display, a first magnet, a second magnet, an electromagnetic induction panel, a waterproof member comprising a waterproof material, and a shielding member comprising a sheet (e.g., a shielding sheet). The housing may include: a first housing part and a second housing part configured to be rotatable with respect to the first housing part, based on a folding axis. The flexible display may include: a first display region, a second display region, and a third display region. The first display region may include an active area forming at least a portion of a front surface of the housing. The second display region may be disposed opposite to the first display region. The second display region may be spaced apart from the first display region. The third display region may connect the first display region and the second display region. The first magnet may be disposed below the flexible display. The first magnet may be disposed in the first housing part. The second magnet may be disposed below the flexible display. The second magnet may be disposed in the second housing part. The second magnet may be configured to be paired with the first magnet to maintain a folded state of the foldable electronic device. The electromagnetic induction panel may be disposed below the first display region. The waterproof member may be in contact with the second display region between the electromagnetic induction panel and the second display region. The shielding member may be disposed between the second magnet and a portion of the second display region positioned above the second magnet.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
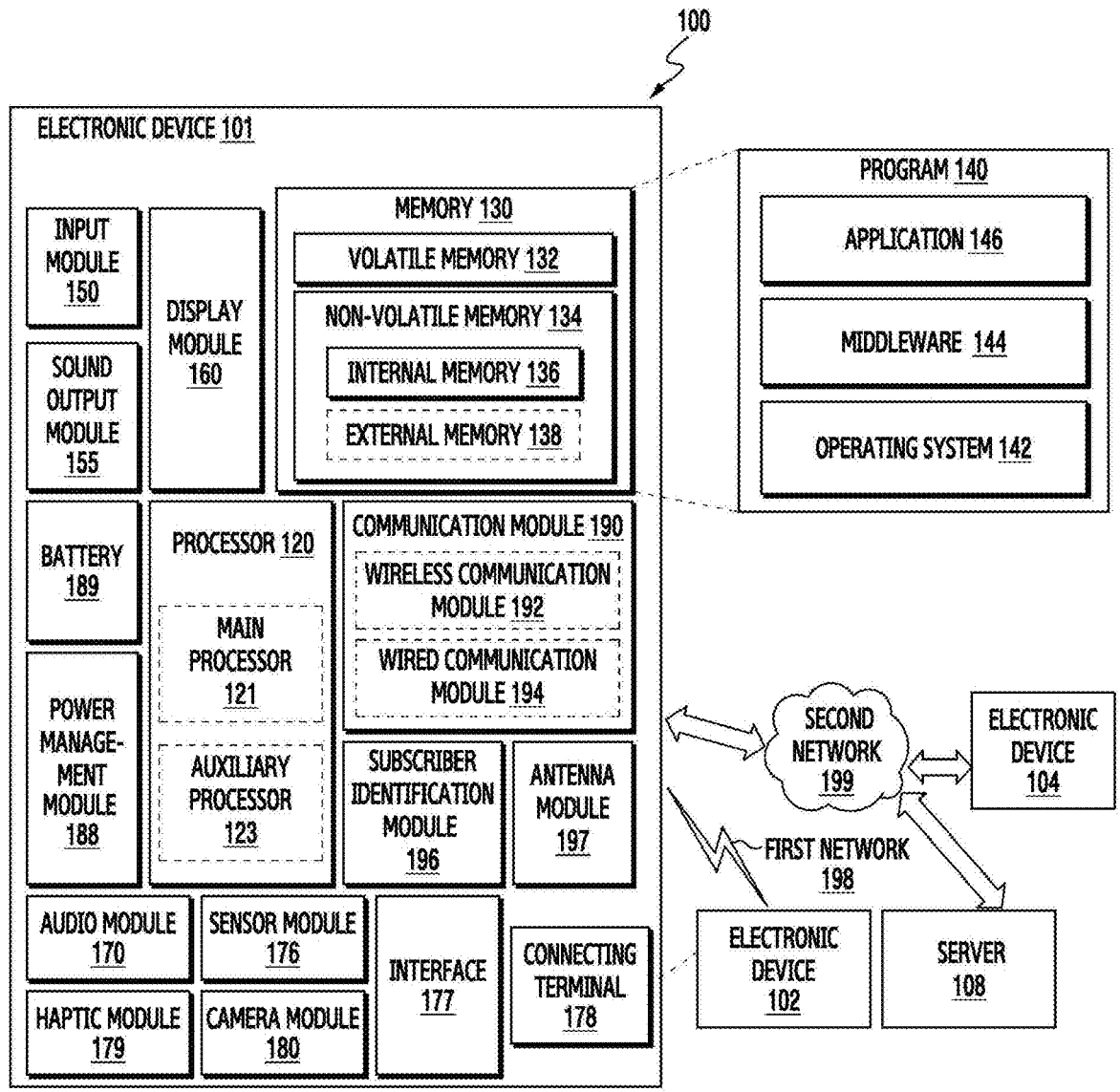
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
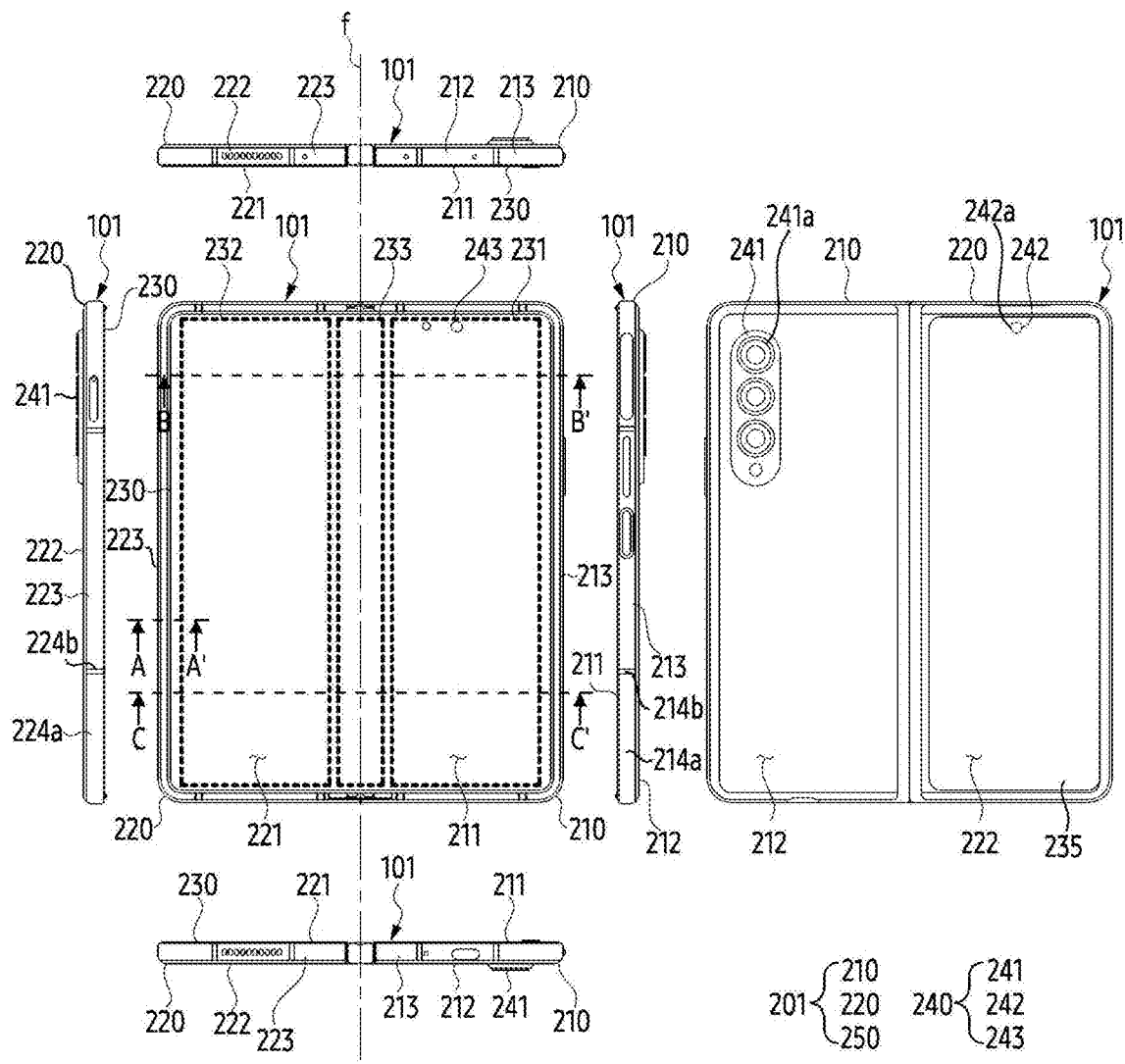
FIG. 2A is a diagram illustrating an example of an unfolded state of an example foldable electronic device according to various embodiments.
Figure 2A:
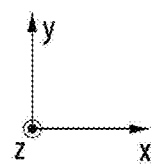
Figure 2B:
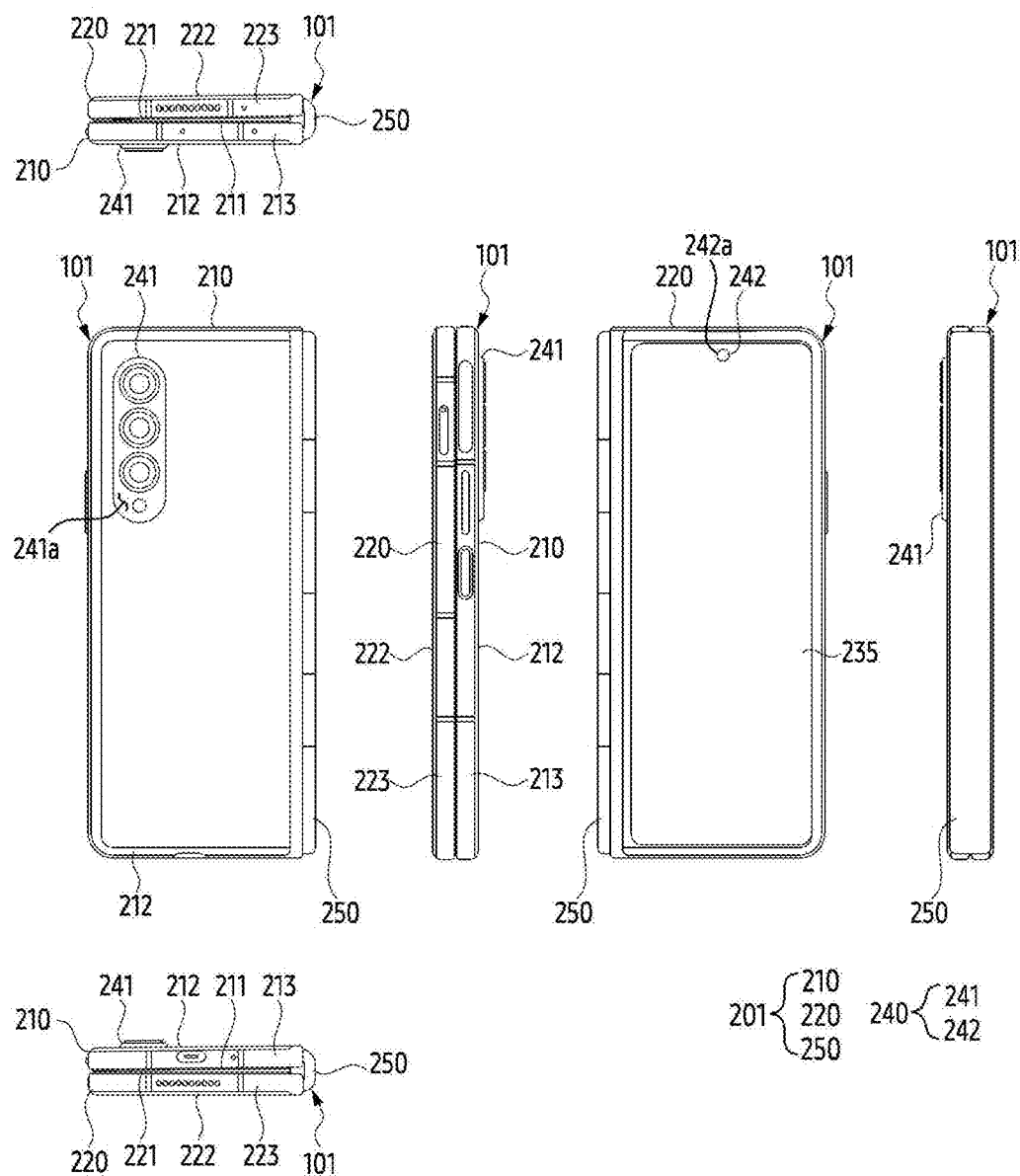
FIG. 2B is a diagram illustrating an example of a folded state of an example foldable electronic device according to various embodiments.
Figure 2C:
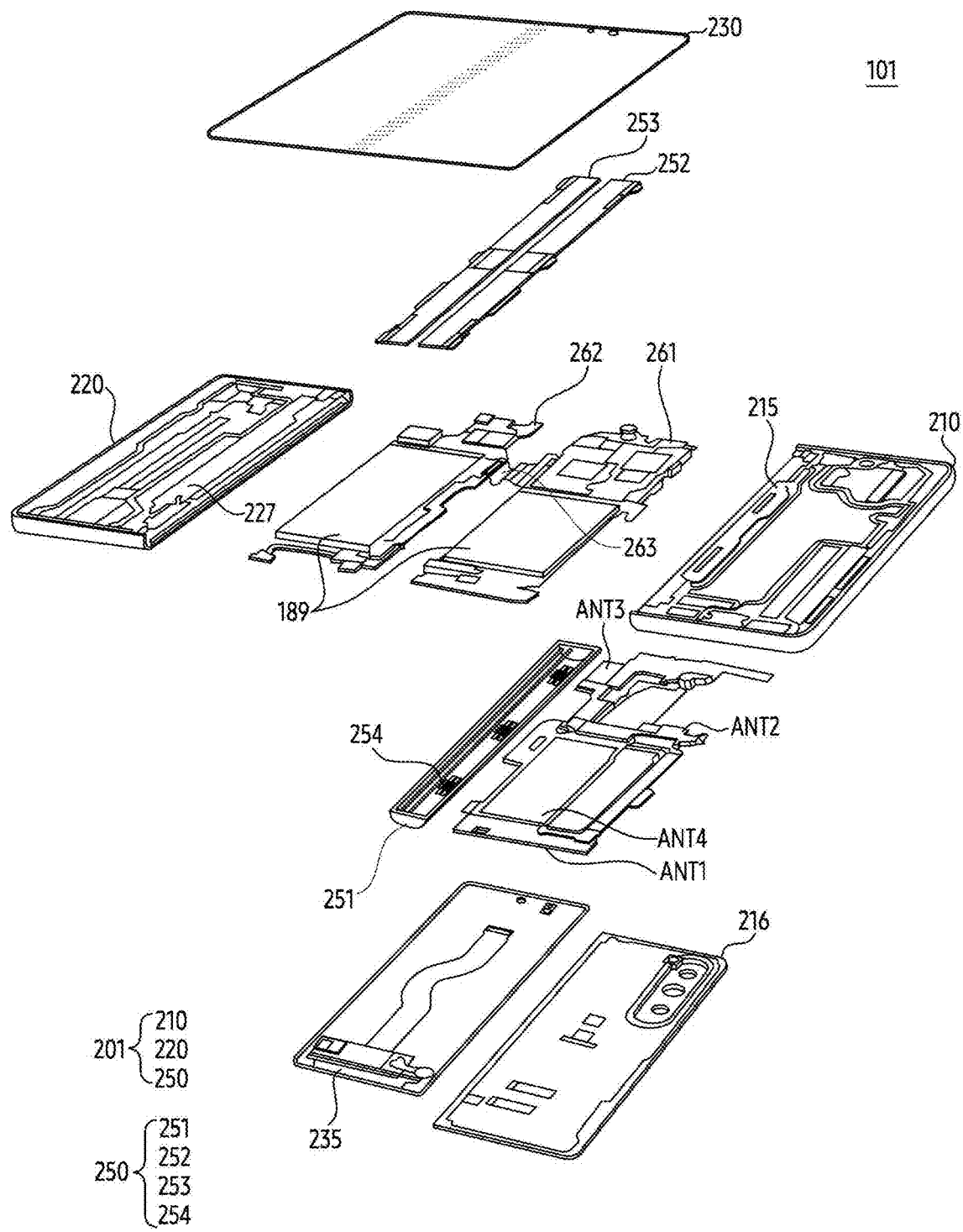
FIG. 2C is an exploded perspective view of an example foldable electronic device according to various embodiments.

FIG. 2A is a diagram illustrating an example of an unfolded state of an example foldable electronic device according to various embodiments. FIG. 2B is a diagram illustrating an example of a folded state of the example foldable electronic device according to various embodiments. FIG. 2C is an exploded perspective view of the example foldable electronic device according to various embodiments.

Referring to FIGS. 2A, 2B, and 2C, a foldable electronic device (e.g., the electronic device 101 of FIG. 1) may include a housing 201, a flexible display 230 (e.g., the display module 160 of FIG. 1), and at least one camera 240.

For example, the housing 201 may form an exterior of the foldable electronic device 101. For example, as a physical exterior of the foldable electronic device 101 exposed to the outside, the housing 201 may surround components that are not exposed to the outside by being disposed inside the foldable electronic device 101. For example, the housing 201 may include a first housing part 210, a second housing part 220, and a hinge structure 250.

For example, the first housing part 210 may include a first surface 211, a second surface 212 opposite to the first surface 211, and a first side surface 213 that surrounds at least a portion of the first surface 211 and the second surface 212. For example, the first surface 211 may be referred to as a front surface of the first housing part 210, and the second surface 212 may be referred to as a rear surface of the first housing part 210. The first side surface 213 may be connected to a periphery of the first surface 211 and a periphery of the second surface 212. The first surface 211, the second surface 212, and the first side surface 213 may form an internal space of the first housing part 210. For example, at least one component may be disposed in a space surrounded by the first surface 211, the second surface 212, and the first side surface 213.

For example, the second housing part 220 may include a third surface 221, a fourth surface 222 opposite to the third surface 221, and a second side surface 223 that surrounds at least a portion of the third surface 221 and the fourth surface 222. For example, the third surface 221 may be referred to as a front surface of the second housing part 220, and the fourth surface 222 may be referred to as a rear surface of the second housing part 220. The second side surface 223 may be connected to a periphery of the third surface 221 and a periphery of the fourth surface 222. The third surface 221, the fourth surface 222, and the second side surface 223 may form an internal space of the second housing part 220. For example, at least one component may be disposed in a space surrounded by the third surface 221, the fourth surface 222, and the second side surface 223.

For example, the flexible display 230 may be configured to display visual information. For example, the flexible display 230 may include a display area including a plurality of pixels. For example, an active area may be referred to as an active area displaying visual information. For example, the flexible display 230 may form at least a portion of a front surface of the housing 201. For example, the flexible display 230 may at least partially form the first surface 211 and the third surface 221.

For example, the flexible display 230 may include a first display area 231 forming at least a portion of the first surface 211 of the first housing, a second display area 232 forming at least a portion of the third surface 221 of a second housing part 220, and a third display area 233 disposed between the first display area 231 and the second display area 232. For example, the first display area 231, the second display area 232, and the third display area 233 may at least partially form the front surface of the housing 201. For example, the foldable electronic device 101 may further include a sub-display 235 distinct from the flexible display 230. The sub-display 235 may be disposed on the fourth surface 222 of the second housing part 220. The sub-display 235 may be referred to as a cover display.

For example, the at least one camera 240 may be configured to obtain an image based on receiving light from an external subject of the foldable electronic device 101. For example, the at least one camera 240 may include first cameras 241, a second camera 242, or a third camera 243. For example, the first cameras 241 may be disposed in the first housing part 210. For example, the first housing part 210 may include at least one opening 241a that overlaps the first cameras 241 when the foldable electronic device 101 is viewed from above. The first cameras 241 may obtain an image based on receiving light from an outside of the foldable electronic device 101 through the at least one opening 241a.

For example, the second camera 242 may be disposed in the second housing part 220. The second housing part 220 may include at least one opening 242a that overlaps the second camera 242 when the foldable electronic device 101 is viewed from above. The second camera 242 may obtain an image based on receiving light from the outside of the foldable electronic device 101 through the at least one opening 242a.

For example, the third camera 243 may be disposed in the first housing part 210. For example, the first display area 231 of the flexible display 230 may include at least one opening that overlaps the third camera 243 when the flexible display 230 is viewed from above. The third camera 243 may obtain an image based on receiving light from an outside of the flexible display 230 through the at least one opening.

For example, the second camera 242 and the third camera 243 may be disposed below the flexible display 230 (e.g., −z direction). For example, the second camera 242 and/or the third camera 243 may include an under display camera (UDC) and/or a punch hole camera.

For example, the first housing part 210 and the second housing part 220 may be rotatably coupled. For example, the second housing part 220 may be coupled to the first housing part 210 to be rotatable with respect to the first housing part 210 through the hinge structure 250.

For example, the hinge structure 250 may rotatably connect the first housing part 210 and the second housing part 220. The hinge structure 250 may be disposed between the first housing part 210 and the second housing part 220 of the foldable electronic device 101 so that the foldable electronic device 101 may be folded. The hinge structure 250 may enable the foldable electronic device 101 to be changed from an unfolded state to a folded state. The hinge structure 250 may enable the foldable electronic device 101 to be changed from the folded state to the unfolded state. The hinge structure 250 may maintain the foldable electronic device 101 in an intermediate state between the unfolded state and the folded state.

For example, the unfolded state may be referred to as a state in which a first direction in which a first display area 230a faces and a second direction in which a second display area 230b faces are the same. For example, the folded state may be referred to as a state in which the first direction is opposite to the second direction. When the foldable electronic device 101 is in the folded state, the first housing part 210 and the second housing part 220 may be stacked or overlapped.

For example, when the foldable electronic device 101 is in the folded state and the intermediate state, the first direction and the second direction may be different from each other. For example, when the foldable electronic device 101 is in the folded state, the first direction and the second direction may be opposite to each other. For example, when the foldable electronic device 101 is in the intermediate state, the first direction may have an inclination (e.g., an angle between 0 and 180 degrees) with respect to the second direction.

For example, the foldable electronic device 101 may be rotatable based on folding axis f. The folding axis f may be referred to as a virtual line extending along a direction parallel to a length direction of the foldable electronic device 101 (e.g., y-axis) or a direction parallel to a width direction of the foldable electronic device 101 (e.g., x-axis).

For example, the foldable electronic device 101 may include at least one conductive portion 214a and 224a and at least one non-conductive portion 214b and 224b included in the first side surface 213 and/or the third side surface 223. For example, the at least one conductive portion 214a and 224a may be separated from another conductive portion in the first side surface 213 and/or the third side surface 223 by contacting the at least one non-conductive portion 214b and 224b. The at least one conductive portion 214a and 224a may operate as an antenna radiator to be used for communication with an external electronic device.

Referring to FIG. 2C, the hinge structure 250 may include a hinge cover 251, a first hinge plate 252, a second hinge plate 253, and a hinge module 254. The hinge cover 251 may surround internal components of the hinge structure 250 and form an outer surface of the hinge structure 250. For example, when the foldable electronic device 101 is in the folded state, at least a portion of the hinge cover 251 may be exposed to the outside of the foldable electronic device 101 through a gap between the first housing part 210 and the second housing part 220. According to an embodiment, when the foldable electronic device 101 is in the unfolded state, the hinge cover 251 may not be exposed to the outside of the foldable electronic device 101 by being covered by the first housing part 210 and the second housing part 220.

For example, the first hinge plate 252 and the second hinge plate 253 may rotatably connect the first housing part 210 and the second housing part 220 by being operatively coupled to the first housing part 210 and the second housing part 220, respectively. For example, the first hinge plate 252 may be operatively coupled to a first frame 215 of the first housing part 210, and the second hinge plate 253 may be operatively coupled to a second frame 227 of the second housing part 220. As the first hinge plate 252 and the second hinge plate 253 are operatively coupled to the first frame 215 and the second frame 227, respectively, the first housing part 210 and the second housing part 220 may be rotatable according to rotation of the first hinge plate 252 and the second hinge plate 253.

The hinge module 254 may rotate the first hinge plate 252 and the second hinge plate 253. For example, the hinge module 254 may rotate the first hinge plate 252 and the second hinge plate 253 based on the folding axis f, by including gears capable of being engaged with each other and rotating.

For example, the first housing part 210 may include the first frame 215 and a rear cover 216. The first frame 215 may be disposed inside the first housing part 210 and may support at least one component disposed in the first housing part 210. The rear cover 216 may at least partially form the second surface 222 of the first housing part 210. For example, the second housing part 220 may include the second frame 227. The second frame 227 may be disposed inside the second housing part 220 and may support at least one component disposed in the second housing part 220. For example, the sub-display 235 may be disposed below the second frame 227 (e.g., −z direction).

The example foldable electronic device 101 may include a plurality of electronic components for implementing various functions, in addition to the at least one camera 240 described above. For example, the foldable electronic device 101 may include a first printed circuit board 261, a second printed circuit board 262, a connection structure (e.g., a flexible printed circuit board) 263, and/or a battery 189. The electronic components described above are illustrative only and are not limited thereto.

For example, the first printed circuit board 261 and the second printed circuit board 262 may each provide electrical connection of components in the foldable electronic device 101. For example, the first printed circuit board 261 may be disposed in the first housing part 210, and the second printed circuit board 262 may be disposed in the second housing part 220. The first printed circuit board 261 may provide an electrical connection between electronic components disposed in the first housing part 210. The second printed circuit board 262 may provide an electrical connection between electronic components disposed in the second housing part 220. The connection structure 263 may electrically connect the first printed circuit board 261 and the second printed circuit board 262. For example, the connection structure 263 may extend from the first printed circuit board 261 to the second printed circuit board 262 across the hinge structure 250. For example, the connection structure 263 may at least partially overlap the hinge structure 250.

For example, the battery 189 may include, for example, a non-rechargeable primary battery and/or a rechargeable secondary battery as a device for supplying power to at least one component of the foldable electronic device 101.

For example, the foldable electronic device 101 may include a plurality of antennas ANT1, ANT2, ANT3, and ANT4 to be used for communication with an external electronic device. For example, the foldable electronic device 101 may include a main antenna ANT1, a sub-antenna ANT2, an ultra-wide band (UWB) antenna ANT3, and/or an antenna ANT4 for near field communication. However, the disclosure is not limited thereto.

Hereinafter, one or more components to be described in greater detail below with reference to the drawings may be implemented together with the components of the foldable electronic device 101 described with reference to FIGS. 2A, 2B, and 2C. Components that are the same as those described above are given the same reference numerals, and overlapping descriptions may not be repeated.

In the present disclosure, relative terms such as above and under may be used to describe the relative positions between components. For example, in case that the foldable electronic device 101 illustrated in the drawing is turned over, the above and the under may be switched.

Figure 3A:
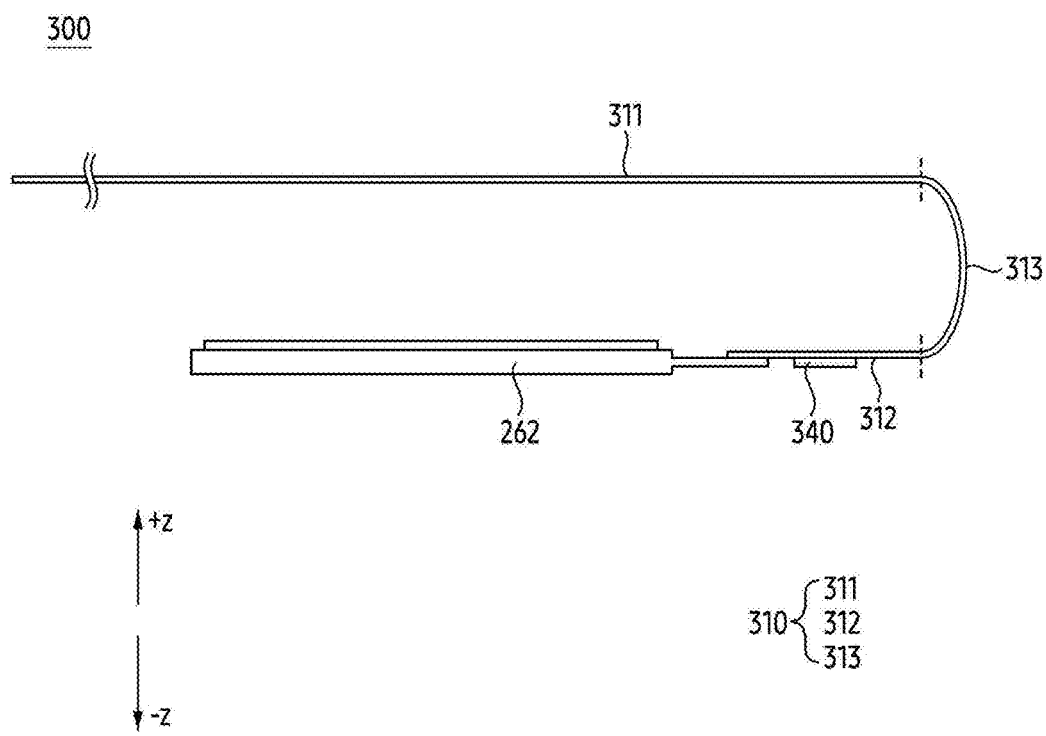
FIG. 3A is a diagram illustrating an example display device according to various embodiments.
Figure 3B:
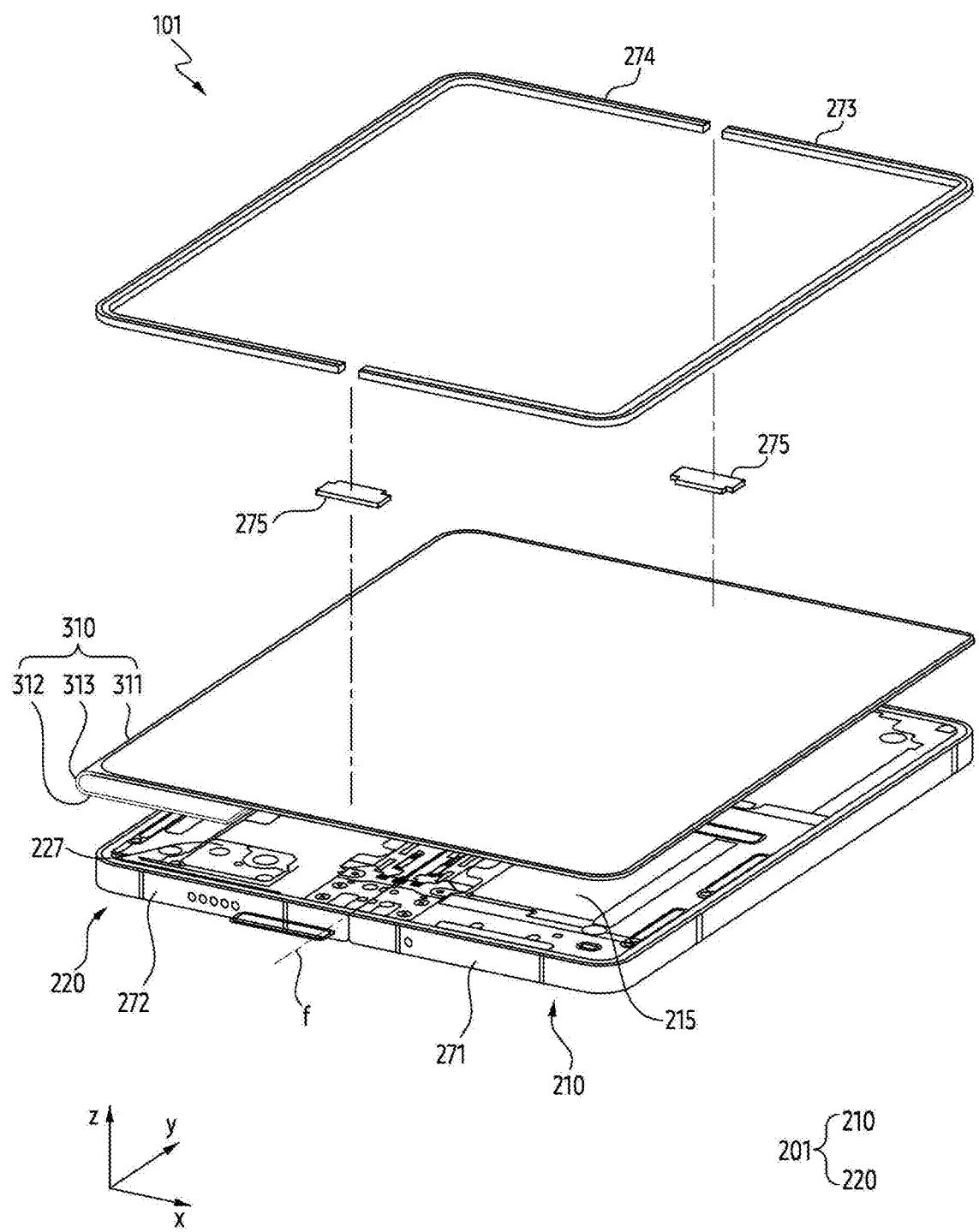
FIG. 3B is an exploded perspective view of an example foldable electronic device according to various embodiments.

FIG. 3A is a diagram illustrating an example display device according to various embodiments. FIG. 3B is an exploded perspective view of an example foldable electronic device according to various embodiments.

Referring to FIG. 3A, a display device 300 (e.g., the display module 160 of FIG. 1) may include a flexible display 310 (e.g., the flexible display 230 of FIG. 2A) and a display driver integrated circuitry (DDI) 340 for driving the flexible display 310. For example, the flexible display 310 may have a structure for being electrically connected to the display driver integrated circuitry 340 and a printed circuit board 262. For example, the flexible display 310 may include a first display region 311, a second display region 312, and a third display region 313. The first display region 311, the second display region 312, and the third display region 313 may be referred to as respective regions of a panel forming the flexible display 310.

For example, the first display region 311 may include an active area for providing visual information. For example, the active area may include a plurality of pixels for displaying visual information. The pixels may refer, for example, to a minimum unit that forms an image when visually displaying the image. The first display region 311 may output an image and/or text using the plurality of pixels in the active area. Since the first display region 311 includes the active area for providing visual information, it may be referred to as a display portion or a display area.

For example, the second display region 312 may be opposed to the first display region 311. For example, the second display region 312 may be positioned below the first display region 311 (e.g., −z direction). For example, the second display region 312 may be spaced apart from the first display region 311. For example, the second display region 312 disposed below the first display region 311 may be electrically connected to the display driver integrated circuitry 340 and the printed circuit board 262. For example, the display driver integrated circuitry 340 may be disposed on a rear surface (e.g., a surface facing the −z direction) of the second display region 312. Since the display driver integrated circuitry 340 is disposed on the second display region 312, the display device 300 may be referred to as a chip on plastic (COP) structure. For example, as the printed circuit board 262 is electrically connected to the second display region 312, the printed circuit board 262 and the display driver integrated circuitry 340 may be electrically connected. For example, the printed circuit board 262 may be a component included in a foldable electronic device 101 illustrated in FIG. 3B and described in greater detail below.

The display driver integrated circuitry 340 may be configured to provide visual information through the flexible display 310 based on receiving a control signal and/or data from at least one processor (e.g., the processor 120 of FIG. 1). For example, the at least one processor may be disposed on the printed circuit board 262. Since the display driver integrated circuitry 340 is electrically connected to the printed circuit board 262 through the second display region 312, the at least one processor may provide the control signal and/or data to the display driver integrated circuitry 340 through the printed circuit board 262 and the second display region 312. For example, the display driver integrated circuitry 340 may control the operation of the plurality of pixels based on obtaining the control signal and/or data from the processor. The display driver integrated circuitry 340 may include a Gate IC that controls on/off of sub-pixels included in the plurality of pixels and a Source IC that controls visual information expressed by the sub-pixels.

For example, the third display region 313 may connect the first display region 311 and the second display region 312 that are spaced apart from each other. For example, the third display region 313 may extend from the first display region 311 to the second display region 312. For example, the third display region 313 may be bent to have a curvature with respect to the first display region 311 and the second display region 312. For example, the third display region 313 may have flexibility.

For example, in order to control the plurality of pixels in the active area, an electrical connection between the display driver integrated circuitry 340 and the first display region 311 may be required. The electrical connection between the display driver integrated circuitry 340 and the first display region 311 may be provided by the second display region 312 and the third display region 313. The display driver integrated circuitry 340 may be electrically connected to the second display region 312 by being disposed on the second display region 312. The second display region 312 may be electrically connected to the first display region 311 through the third display region 313. By the above structure, the electrical connection between the display driver integrated circuitry 340 and the first display region 311 may be established. For example, the first display region 311 may be referred to as a panel portion, and the second display region 312 and the third display region 313 may be referred to as a panel extension portion. For example, the display device 300 may include a plurality of layers. The plurality of layers disposed in the display device 300 will be described in greater detail below with reference to FIGS. 7A and 7B.

Referring to FIG. 3B, an example foldable electronic device 101 may include a housing 201 that forms an exterior of the foldable electronic device 101. The housing 201 may include a housing 201 having a rotatable structure. For example, the housing 201 may include a first housing part 210 and a second housing part 220 that is rotatable with respect to the first housing part 210. The first housing part 210 and the second housing part 220 may be rotatable based on a folding axis f. For example, the foldable electronic device 101 may include a first frame 215 for supporting components related to the first housing part 210 and a second frame 227 for supporting components related to the second housing part 220. At least a portion of the first frame 215 may be surrounded by a first side bezel structure 271, and at least a portion of the second frame 227 may be surrounded by a second side bezel structure 272. The display device 300 illustrated in FIG. 3A may be included in the foldable electronic device 101.

The example foldable electronic device 101 may include protective members 273 and 274 for protecting a periphery of the flexible display 310. For example, the protective members 273 and 274 may form a portion of the housing 201. For example, the first display region 311 may be at least partially supported by the first frame 215 and the second frame 227. Although not illustrated, the example foldable electronic device 101 may include adhesive members (e.g., double-sided tape) for attaching the flexible display 310 on the first frame 215 and the second frame 227. For example, the periphery of the flexible display 310 may be exposed to an outside of the foldable electronic device 101 by being spaced apart from the first side bezel structure 271 and the second side bezel structure 272. The protective members 273 and 274 may at least partially cover the exposed periphery of the flexible display 310. For example, the first protective member 273 may cover a periphery of the first display region 311 that forms at least a portion of a front surface of the first housing part 210. For example, the second protective member 274 may cover a periphery of the second display region 312 that forms at least a portion of a front surface of the second housing part 220. The periphery of the flexible display 310 may not be exposed to the outside of the foldable electronic device 101 by being at least partially covered by the protective members 273 and 274. The protective members 273 and 274 may reduce damage to the flexible display 310.

For example, the third display region 313 may be positioned above the second frame 227 (e.g., +z direction). The third display region 313 may protrude toward the second side bezel structure 272 since it extends from the first display region 311 to the second display region 312 positioned below the first display region 311. The second protective member 274 may cover the third display region 313 by being disposed on the third display region 313. For example, the size of the second display region 312 may be smaller than the size of the first display region 311. The first display region 311 may at least partially form the front surface of the first housing part 210 and the front surface of the second housing part 220. The second display region 312 may be positioned inside the second housing part 220.

For example, since the folding axis f may be positioned between the first protective member 273 and the second protective member 274, the first protective member 273 and the second protective member 274 may be spaced apart from each other with the folding axis f interposed therebetween. The example foldable electronic device 101 may include a cap 275 for covering a gap between the first protective member 273 and the second protective member 274.

Figure 4:
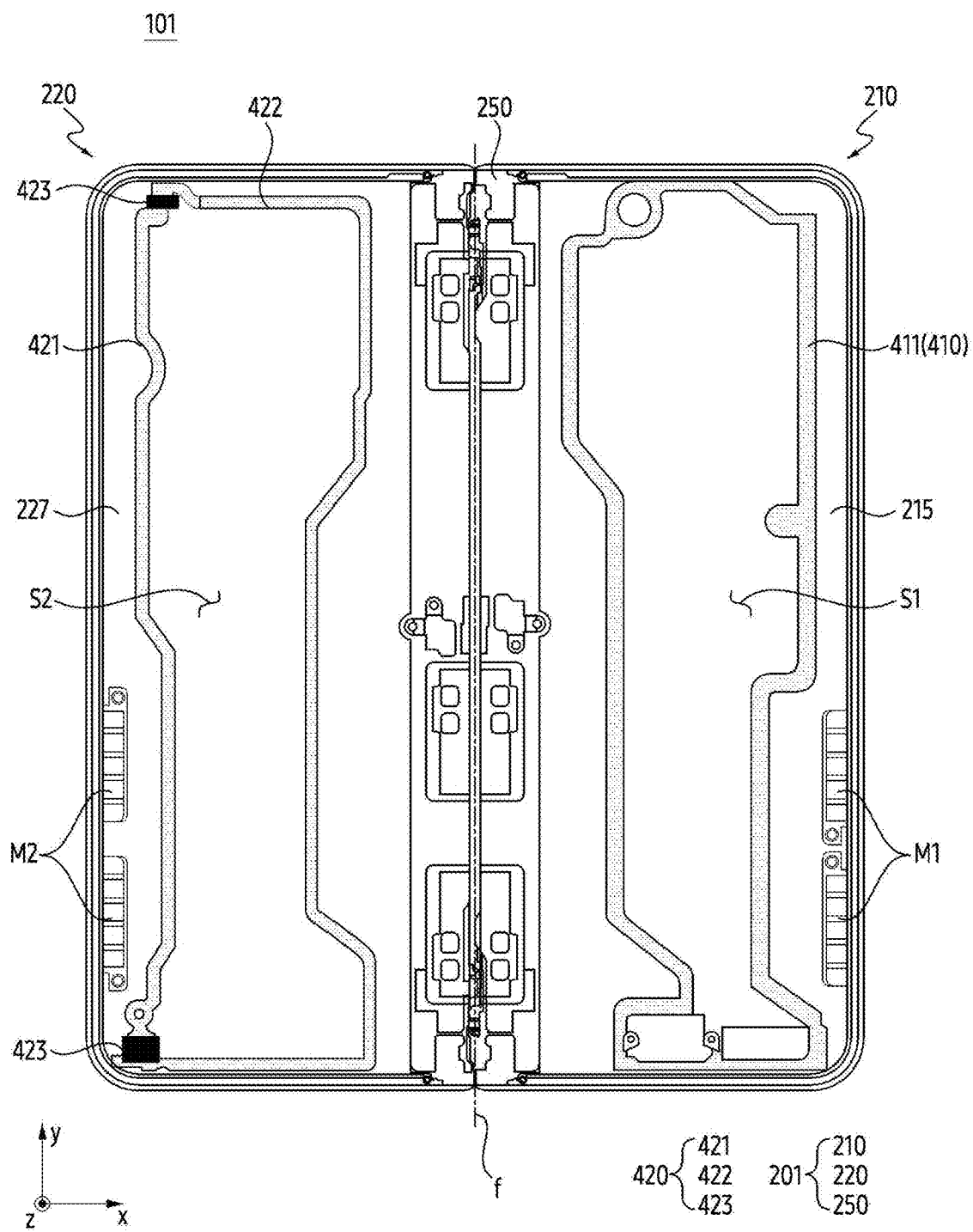
FIG. 4 is a diagram illustrating a portion of a housing of an example foldable electronic device according to various embodiments.

FIG. 4 is a diagram illustrating a portion of a housing of an example foldable electronic device according to various embodiments.

Referring to FIG. 4, an example foldable electronic device 101 may include a housing 201, a hinge structure 250, and magnets M1 and M2.

For example, the foldable electronic device 101 may include a first frame 215 and a second frame 227 disposed inside the housing 201. For example, the first frame 215 may support a portion of a flexible display (e.g., the flexible display 310 of FIG. 3B). For example, the portion of the flexible display 310 supported by the first frame 215 may be a portion of the flexible display 310 that forms at least a portion of a front surface (e.g., a surface in the +2 direction) of a first housing part 210. For example, the second frame 227 may support another portion of the flexible display 310. For example, the other portion of the flexible display 310 supported by the first frame 215 may be a portion of the flexible display 310 that forms at least a portion of a front surface of a second housing part 220.

For example, the hinge structure 250 may rotatably connect the first housing part 210 and the second housing part 220. For example, the hinge structure 250 may include a first hinge plate operatively coupled to the first frame 215 and a second hinge plate operatively coupled to the second frame 227. For example, rotation of the second hinge plate with respect to the first hinge plate may cause rotation of the second frame 227 with respect to the first frame 215. By rotation of the second frame 227 with respect to the first frame 215, the second housing part 220 may be rotated with respect to the first housing part 210. For example, the foldable electronic device 101 may be in a folded state, an unfolded state, and a plurality of intermediate states. The hinge structure 250 may provide the above states of the foldable electronic device 101.

The example foldable electronic device 101 may include a first waterproof structure 410 and a second waterproof structure 420. For example, the first waterproof structure 410 may form a first waterproof space S1 between the portion of the flexible display 310 and the first frame 215. For example, the first waterproof structure 410 may be formed by a first waterproof tape 411. For example, the first waterproof tape 411 may attach the portion of the flexible display 310 on the first frame 215.

As illustrated in FIG. 4, the first waterproof tape 411 may form the first waterproof space S1 by having a closed loop shape. For example, the first waterproof tape 411 may be spaced apart from the first magnet M1. The first waterproof tape 411 that forms the first waterproof space S1 may reduce the inflow of moisture into the first waterproof space S1. For example, electronic components and/or electronic circuits disposed in the first waterproof space S1 surrounded by the first waterproof tape 411 may be protected from moisture and/or foreign substance.

For example, the second waterproof structure 420 may form a second waterproof space S2 between the other portion of the flexible display 310 and the second frame 227. For example, the second waterproof structure 420 may be formed by a second waterproof tape 421, a third waterproof tape 422, and a resin part 423. For example, the second waterproof tape 421 may attach the second display region 312 on the second frame 227 by being disposed between the second display region 312 and the second frame 227. For example, the second waterproof tape 421 may be attached to each of the second frame 227 positioned inside the second housing part 220 and the second display region 312. For example, the second waterproof tape 421 may extend along an extension direction (e.g., y-axis) of a folding axis f. For example, the third waterproof tape 422 may attach the first display region 311 on the second frame 227. For example, the third waterproof tape 422 may be disposed outside the second display region 312 on the second frame 227. A space between the second waterproof tape 421 and the third waterproof tape 422 may be stepped by the second display region 312. A gap due to the step between the second waterproof tape 421 and the third waterproof tape 422 may be filled by the resin part 423. As the gap is filled by the resin part 423, the second waterproof tape 421, the third waterproof tape 422, and the resin part 423 may form a closed loop. The second waterproof space S2 may be formed by the closed loop. As the second waterproof space S2 is formed, the inflow of moisture into the second waterproof space S2 may be reduced. For example, electronic components and/or electronic circuits disposed within the first waterproof space S1 surrounded by the second waterproof tape 421, the third waterproof tape 422, and the resin part 423 may be protected from moisture and/or foreign substance.

The example foldable electronic device 101 may include the magnets M1 and M2 for maintaining the folded state of the foldable electronic device 101. For example, the foldable electronic device 101 may include the first magnet M1 and the second magnet M2. For example, the first magnet M1 may be disposed below the flexible display 310 (e.g., -z direction). For example, the first magnet M1 may be disposed inside the first frame 215. For example, the second magnet M2 may be disposed below the flexible display 310. For example, the second magnet M2 may be disposed inside the second frame 227. The second magnet M2 may be paired with the first magnet M1 in order to maintain the folded state of the foldable electronic device 101. For example, in the folded state of the foldable electronic device 101, the folded state may be maintained by an attractive force between the first magnet M1 and the second magnet M2. The foldable electronic device 101 may be changed from the folded state to the unfolded state by an external force greater than the attractive force. For example, the first magnet M1 may be disposed adjacent to a periphery of the first frame 215, and the second magnet M2 may be disposed adjacent to the periphery of the second frame 227.

Figure 5:
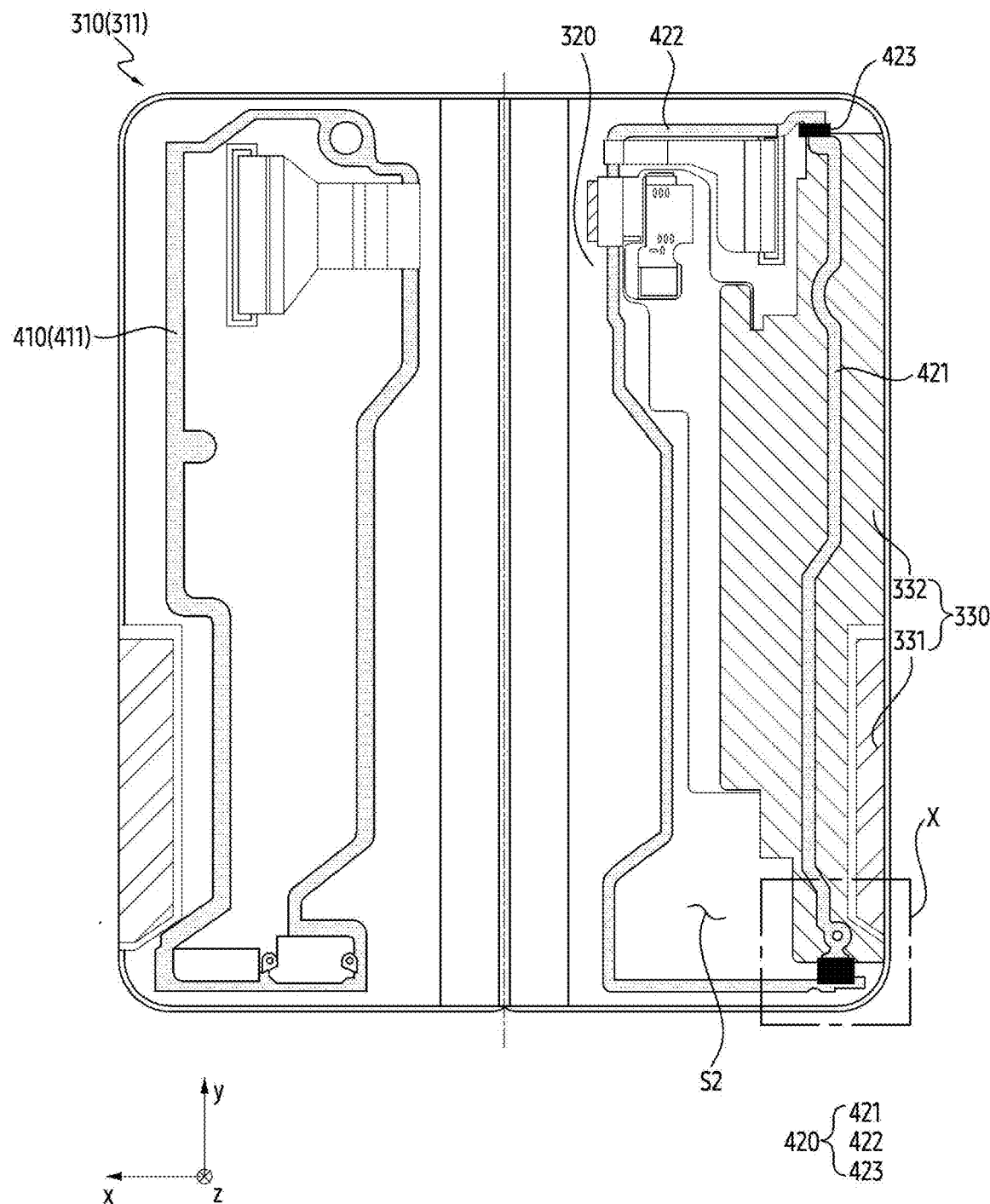
FIG. 5 is a diagram illustrating a rear surface of an example flexible display according to various embodiments, in which a second display region is omitted.

FIG. 5 is a diagram illustrating a rear surface of an example flexible display according to various embodiments.

For convenience of explanation, a third display region (e.g., the third display region 313 of FIG. 3A) connected to one side of a first display region 311 and a second display region (e.g., the second display region 312 of FIG. 3A) connected to the third display region 313 are omitted in FIG. 5.

For example, a plurality of layers may be interposed in the first display region 311 and the second display region 312. For example, the plurality of layers may include a first layer 320 and a second layer 330. For example, the first layer 320 may include an electromagnetic induction panel (e.g., an electromagnetic induction panel 321 of FIG. 6B) and/or a conductive sheet (e.g., a conductive sheet 322 of FIG. 7A). For example, the first layer 320 may be disposed below the first display region 311 (e.g., -z direction). For example, the second layer 330 may be disposed below the first layer 320. A stack structure and components of the first layer 320 and the second layer 330 will be described later.

Referring to FIG. 5, the second layer 330 may include a shielding member 331 and a waterproof member 332. For example, the shielding member 331 may reduce interference between a second magnet (e.g., the second magnet M2 of FIG. 4) and the electromagnetic induction panel 321 (refer, for example, to FIG. 6A). For example, the shielding member 331 may be disposed between the second magnet M2 and a portion of the electromagnetic induction panel 321 positioned on the second magnet M2. For example, the size of the electromagnetic induction panel 321 may correspond to the size of the second magnet M2.

For example, the waterproof member 332 may surround the shielding member 331 in the second layer 330. For example, by filling a gap between the first display region 311 and the second display region 312, the waterproof member 332 may reduce moisture flowing in through the gap. For example, the waterproof member 332 may include an adhesive and/or a flexible material (e.g., butyl rubber, foam, polyethylene, and/or polyurethane).

For example, the shielding member 331 and the waterproof member 332 disposed in the same layer (e.g., the second layer 330) may be disposed on substantially the same plane. For example, the shielding member 331 may be disposed on substantially the same plane as the waterproof member 332 in the second layer 330. The fact that the shielding member 331 is disposed on substantially the same plane as the waterproof member 332 may refer that the shielding member 331 and the waterproof member 332 do not overlap, and the shielding member 331 is disposed parallel to the waterproof member 332. As illustrated in FIG. 5, the waterproof member 332 may be disposed to avoid the shielding member 331. A thickness of the flexible display 310 may be reduced, since the waterproof member 332 and the shielding member 331 do not overlap and are disposed parallel on the same layer.

Figure 6A:
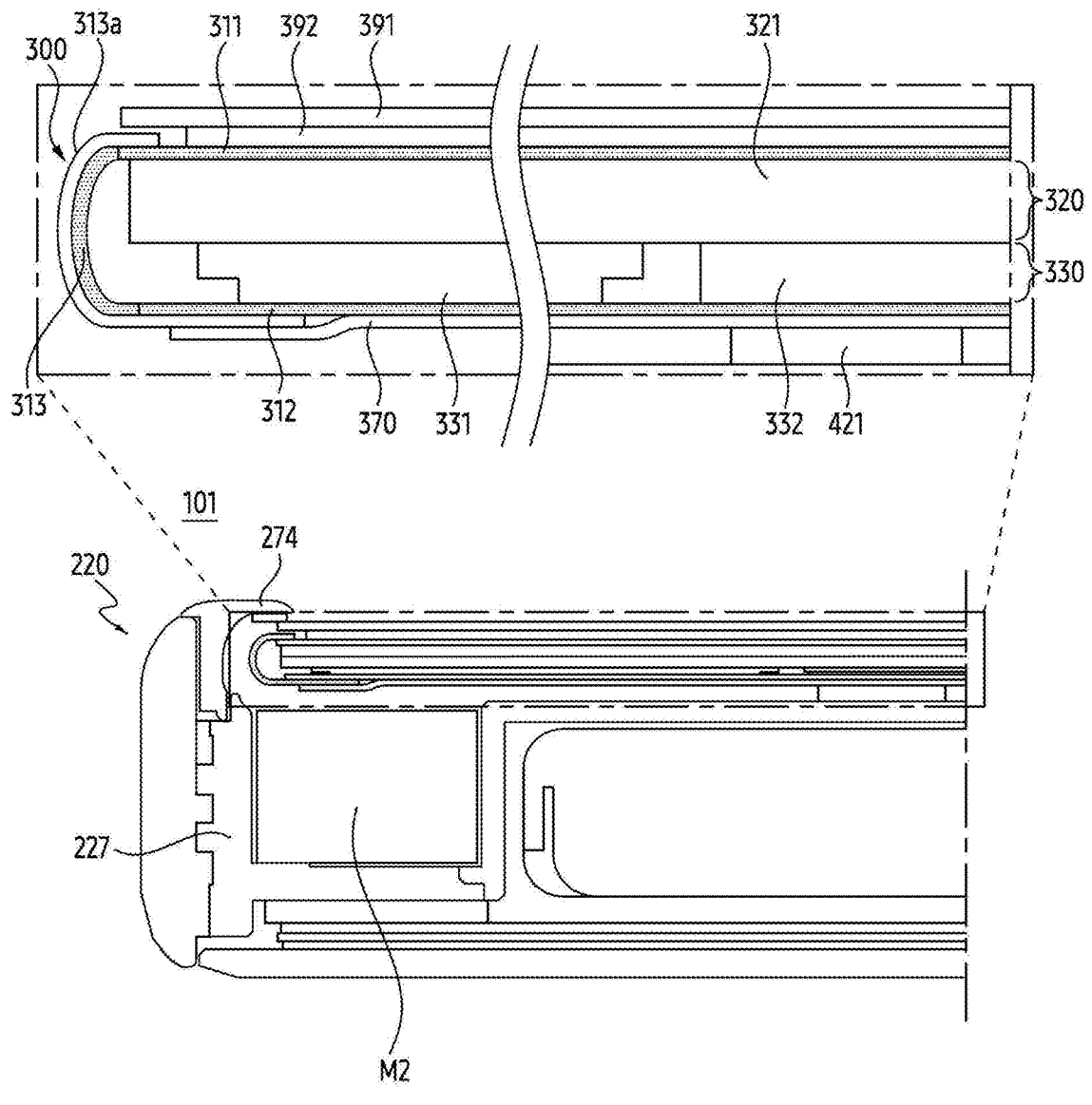
FIG. 6A is a cross-sectional view of an example foldable electronic device taken along A-A' of FIG. 2A according to various embodiments.
Figure 6B:
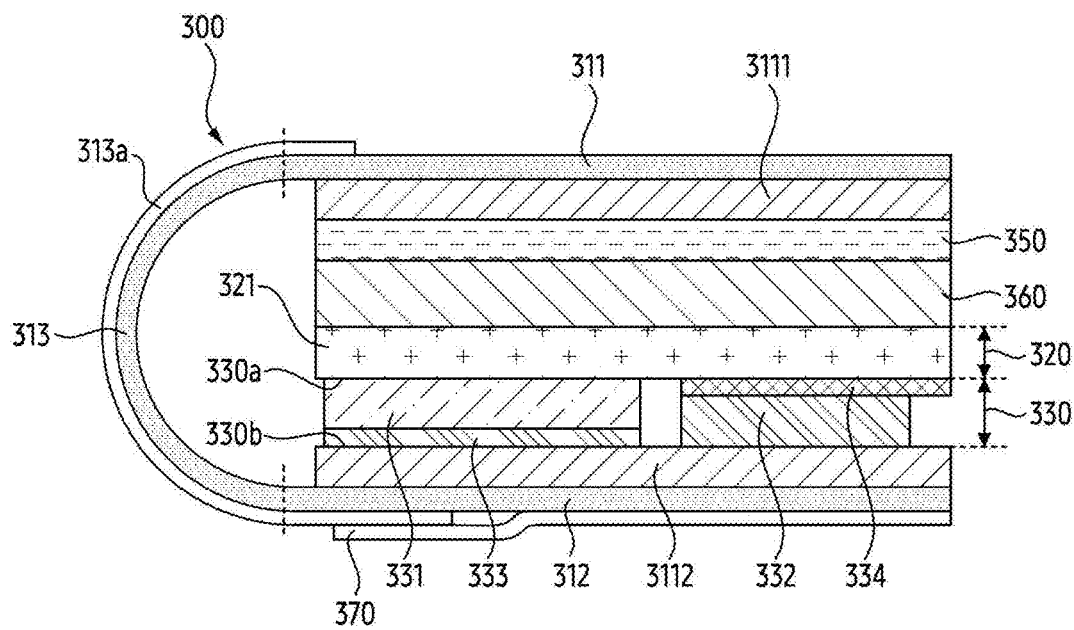
FIG. 6B is an enlarged cross-sectional view with respect to a portion of a display device according to various embodiments.

FIG. 6A is a cross-sectional view of an example foldable electronic device taken along A-A' of FIG. 2A according to various embodiments. FIG. 6B is a diagram illustrating an enlarged view with respect to a portion of a display device according to various embodiments.

Referring to FIG. 6A, a second protective member 274 may protect a flexible display 310 by covering a portion of the flexible display 310. A third display region 313 may be covered by the second protective member 274. For example, a plurality of layers may be disposed between a first display region 311 and a second display region 312. For example, the plurality of layers may include a first layer 320 and a second layer 330. For example, the first layer 320 may include an electromagnetic induction panel 321. For example, the second layer 330 may include a shielding member 331 and a waterproof member 332.

For example, the electromagnetic induction panel 321 may be configured to receive an input from an external electronic device. For example, the external electronic device may include an electronic pen and/or a stylus pen configured to provide an input through the electromagnetic induction panel 321. The electromagnetic induction panel 321 may be configured to receive a hovering input or a touch input on the flexible display 310. For example, the electromagnetic induction panel 321 may be referred to as an electromagnetic resonance (EMR) panel and/or a digitizer.

For example, the electromagnetic induction panel 321 may be configured to transmit an electromagnetic signal to an external electronic device or receive an electromagnetic signal from an external electronic device. For example, at least one processor (e.g., the processor 120 of FIG. 1) may transmit a first electromagnetic signal to an external electronic device through the electromagnetic induction panel 321. The first electromagnetic signal received by the external electronic device may cause electromagnetic resonance in the external electronic device. For example, the first electromagnetic signal may cause electromagnetic induction of a coil inside the external electronic device. A second electromagnetic signal generated by electromagnetic resonance in the external electronic device may be transmitted to the electromagnetic induction panel 321. For example, the external electronic device may generate the second electromagnetic signal based on the current in the coil generated by electromagnetic induction and transmit the generated second electromagnetic signal to the electromagnetic induction panel 321. By the current generated by the electromagnetic induction, the external electronic device may generate the second electromagnetic signal without a separate power supply. The second electromagnetic signal received by the electromagnetic induction panel 321 may cause electromagnetic resonance in the electromagnetic induction panel 321. The at least one processor may identify an input from the external electronic device based on a third electromagnetic signal generated by electromagnetic resonance in the electromagnetic induction panel 321. However, the disclosure is not limited thereto.

For example, the shielding member 331 may be disposed between a second magnet M2 disposed below the flexible display 310 (e.g., −z direction) and a portion of the electromagnetic induction panel 321 positioned above the second magnet M2 (e.g., +z direction). The portion of the electromagnetic induction panel 321 positioned above the second magnet M2 may be referred to as a portion that overlaps the second magnet M2 in the electromagnetic induction panel 321.

For example, the portion of the electromagnetic induction panel 321 may be positioned above the second magnet M2 disposed in a second frame 227. The shielding member 331 may reduce the influence of a magnetic field formed by the second magnet M2 on the electromagnetic induction panel 321. For example, the magnetic field formed by the second magnet M2 may interfere with the electromagnetic induction panel 321. For example, the magnetic field formed by the second magnet M2 may cause malfunction of the electromagnetic induction panel 321 by influencing the electromagnetic resonance caused in the electromagnetic induction panel 321 by the external electronic device. The shielding member 331 may be disposed between the second magnet M2 and the portion of the electromagnetic induction panel 321 positioned above the second magnet M2 to reduce the influence of the magnetic field formed by the second magnet M2 on the electromagnetic induction panel 321. In order to reduce the influence, the size of the shielding member 331 may correspond to or be greater than the size of the portion of the electromagnetic induction panel 321. For example, the shielding member 331 may include an amorphous ribbon sheet (ARS). The shielding member 331 may include a shielding sheet.

Since the second display region 312 is spaced apart from the first display region 311, a gap may be formed between the first display region 311 and the second display region 312. In case that the gap is an empty space, moisture and/or foreign substance may flow in through the gap. For example, in case that moisture flows in through the gap, the flexible display 310 may be damaged by the moisture. For example, the waterproof member 332 may reduce the inflow of moisture through the gap by filling the gap between the first display region 311 and the second display region 312. For example, the waterproof member 332 may include a spacer that fills the empty space by occupying the empty space. For example, the waterproof member 332 may have flexibility to fill the gap.

For example, the waterproof member 332 may be disposed parallel to the shielding member 331. For example, the waterproof member 332 and the shielding member 331 may be disposed in different layers and do not overlap, but may be disposed in the same layer (e.g., the second layer 330). For example, the waterproof member 332 and the shielding member 331 may be disposed on substantially the same plane. For example, in case that the shielding member 331 is disposed on the waterproof member 332, a distance between the first display region 311 and the second display region 312 increases, so a thickness of the flexible display 310 may increase. As the thickness increases, the curvature of the third display region 313 connecting the first display region 311 and the second display region 312 may increase, and for a mounting space of an electronic component (e.g., a speaker and/or battery) that overlaps the second display region 312, a thickness of the second frame 227 may increase. The distance between the first display region 311 and the second display region 312 may be reduced as an example foldable electronic device 101 includes a waterproof member 332 and a shielding member 331 disposed parallel to each other in the same layer (e.g., the second layer 330). By reducing the distance, the thickness of the flexible display 310 and the thickness of the second frame 227 may become thinner, and the curvature of the third display region 313 may be reduced.

Referring to FIG. 6B, the first layer 320 may include the electromagnetic induction panel 321 disposed below the first display region 311 (e.g., −z direction). For example, the second layer 330 may be in contact with the second display region 312 (e.g., a second polymer film 3112) between the first layer 320 and the second display region 312. The second layer 330 may be interposed between the first layer 320 and the second display region 312.

For example, the second layer 330 may include a first surface 330a and a second surface 330b. For example, the first surface 330a may be a surface of the second layer 330 facing the first display region 311. For example, the first surface 330a may face a +z direction. The second surface 330b may be opposite to the first surface 330a. For example, the second surface 330b may be a surface of the second layer 330 facing the second display region 312. For example, the second surface 330b may face a-z direction. Referring to FIG. 6B, the first surface 330a may be in contact with the first layer 320, and the second surface 330b may be in contact with the second display region 312.

For example, the first display region 311 and the second display region 312 may include at least one polymer film 3111 and 3112, which is a base substrate. For example, the first display region 311 may include the first polymer film 3111 and the second display region 312 may include the second polymer film 3112. The at least one polymer film 3111 and 3112 may protect the flexible display 310 and improve electrical characteristics of the flexible display 310 by having high heat resistance, transparency, and electrical characteristics. For example, the at least one polymer film 3111 and 3112 may include a polyimide (PI) film. However, the disclosure is not limited thereto.

For example, the second polymer film 3112 may be in contact with the second layer 330. For example, the second layer 330 may further include an adhesive member 333 that attaches the shielding member 331 to the polymer film 3112. For example, the adhesive member 333 may include an optically clear adhesive (OCA), but is not limited thereto. The adhesive member 333 may include an adhesive sheet. The adhesive member 333 may attach the shielding member 331 on the second polymer film 3112. For example, in case that the shielding member 331 is interposed between the first layer 320 and the second polymer without the adhesive member 333, the shielding member 331 may not be fixed. Due to the non-fixed shielding member 331, a wrinkle and damage of the flexible display 310 may be caused. The adhesive member 333 may reduce the wrinkle and the damage by fixing the shielding member 331 by attaching the shielding member 331 on the second polymer film 3112.

For example, the second layer 330 may further include a support 334 interposed between the first layer 320 and the waterproof member 332. For example, the support 334 may include a conductive material (e.g., copper) and/or a non-conductive material (e.g., polyethylene terephthalate (PET)). However, the disclosure is not limited thereto. The support 334 may form a thickness of the second layer 330 by filling a space between the waterproof member 332 and the first layer 320. The support 334 may compensate for a difference between a thickness of the shielding member 331 and the adhesive member 333 and a thickness of the waterproof member 332. For example, the thicknesses of the shielding member 331 and the adhesive member 333 may correspond to the thicknesses of the waterproof member 332 and the support 334. For example, the thickness of the shielding member 331 may be about 80 μm to 100 μm, and the thickness of the adhesive member 333 may be about 20 μm to 30 μm. For example, the thickness of the waterproof member 332 may be about 80 μm to 100 μm, and the thickness of the support 334 may be about 20 μm to 30 μm. The overall thickness of the second layer 330 may be substantially constant as the thicknesses of the shielding member 331 and the adhesive member 333 corresponds to the thicknesses of the waterproof member 332 and the support 334. For example, the thickness of the second layer 330 may be about 100 μm to 130 μm. In case that the shielding member 331 and the waterproof member 332, which have the same thickness as the above-described thickness, overlap, the thickness of the second layer 330 may be about 160 μm to 200 μm. The thickness of the second layer 330 may be relatively thin as the shielding member 331 and the waterproof member 332 are disposed in parallel in the second layer 330. The above-described thickness value is merely an example and the disclosure is not limited thereto.

Referring to FIGS. 6A and 6B, various components may be disposed in a display device 300. For example, a barrier member (e.g., a barrier member 350 of FIG. 6B) and/or a polymer member (e.g., a polymer member 360 of FIG. 6B) may be disposed between the first polymer film 3111 and the first layer 320. For example, the barrier member 350 may reduce the wrinkle of the first display region 311 that may be caused by the spaced space between the shielding member 331 and the waterproof member 332. For example, the polymer member 360 may include a polymer (e.g., carbon fiber reinforced plastic (CFRP)) having rigidity. The polymer member 360 may support the first display region 311. For example, a protective tape 370 for discharging static electricity may be disposed below the second display region 312 (e.g., −z direction). For example, a bending protection layer (BPL) 313a for protecting the bent third display region 313 may be disposed on an outer surface of the third display region 313. For example, a protective sheet (e.g., a protective sheet 391 of FIG. 6A) for protecting an active area may be disposed above the first display part 311 (e.g., +z direction). For example, a polarization layer (e.g., a polarization layer 392 of FIG. 6A) for reducing the amount of light reflected in the active area may be disposed above the first display part 311 (e.g., +z direction). In addition, various components may be disposed in the display device 300.

Figure 7A:
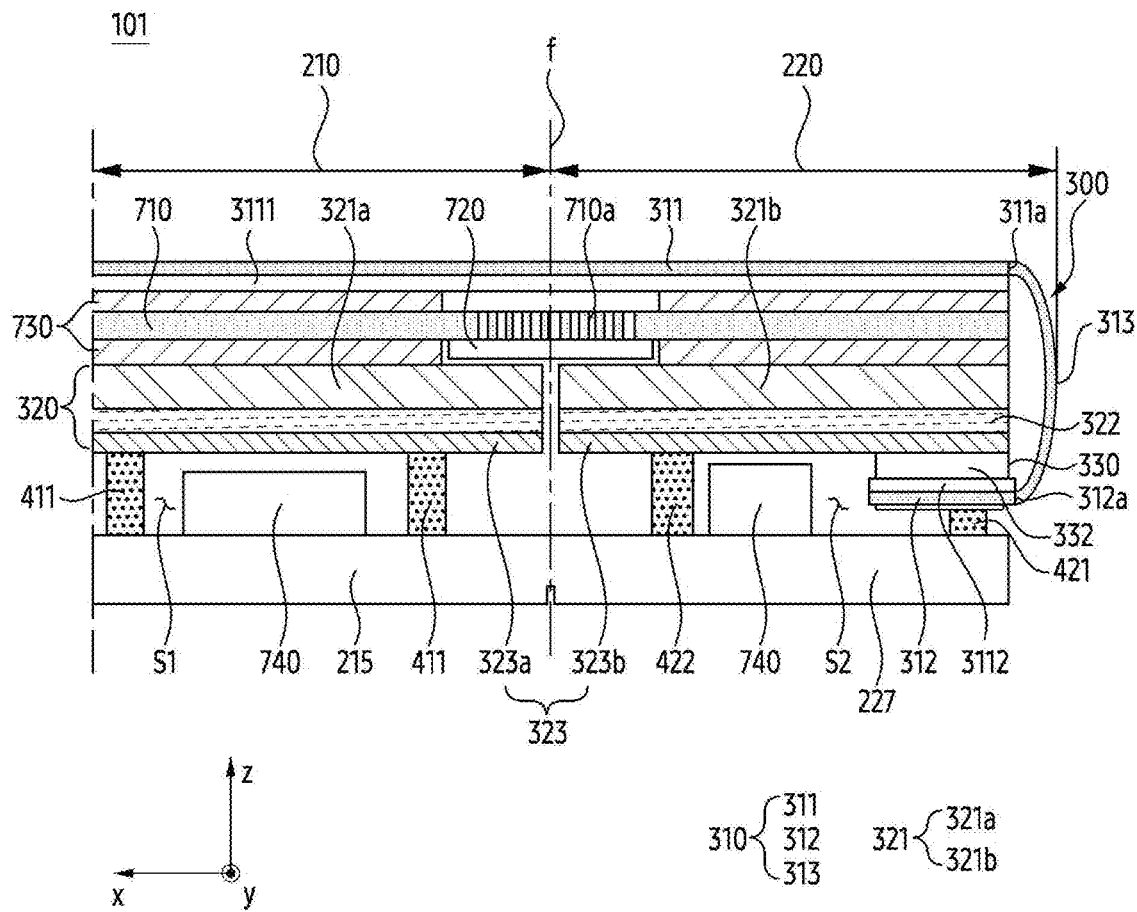
FIG. 7A is a cross-sectional view illustrating a cross section of an example foldable electronic device taken along B-B' of FIG. 2A according to various embodiments.
Figure 7B:
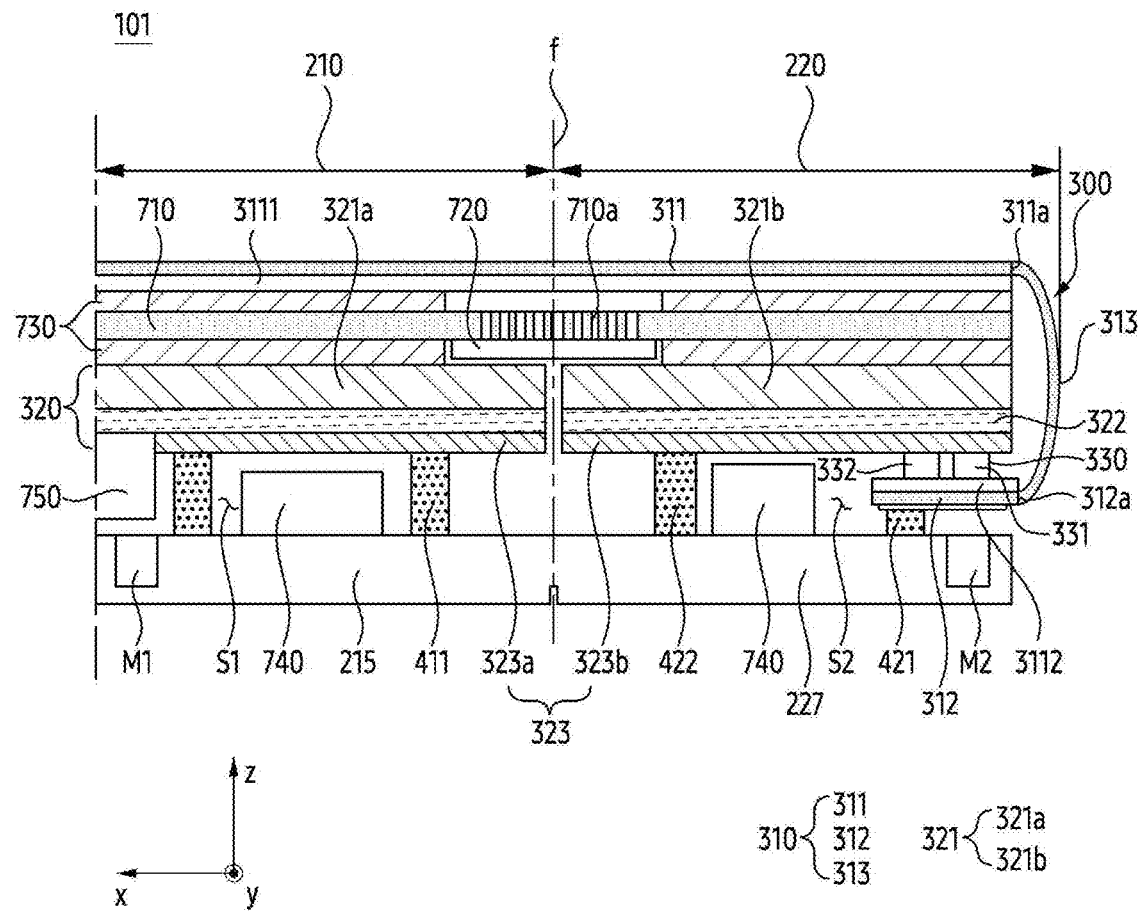
FIG. 7B is a cross-sectional view illustrating a cross section of an example foldable electronic device taken along C-C' of FIG. 2A according to various embodiments.

FIG. 7A is a cross-sectional view illustrating a cross section of an example foldable electronic device taken along B-B' of FIG. 2A according to various embodiments. FIG. 7B is a cross-sectional view illustrating a cross section of the example foldable electronic device taken along C-C' of FIG. 2A according to various embodiments.

Referring to FIGS. 7A and 7B, a third display region 313 may be positioned inside a second housing part 220 among a first housing part 210 and the second housing part 220. For example, the third display region 313 may extend to one end 312a of the second display region 312 in the second housing part 220 by bending at least partially from one end 311a of the first display region 311 included in the second housing part 220. For example, the second display region 312 may extend from the one end 312a of the second display region 312 to a point in the second housing part 220. For example, the second display region 312 may not be disposed in the first housing part 210.

For example, a display device 300 may include a plurality of layers. For example, the plurality of layers may be interposed between the first display region 311 and the second display region 312. For example, the plurality of layers may include the first layer 320 and the second layer 330 described above, but are not limited thereto. For example, the plurality of layers may further include a support plate 710 disposed below the first display region 311 (e.g., −z direction), a step compensation film 720 disposed below a lattice portion 710a of the support plate 710, and/or adhesive members 730 interposed between the first display region 311 and the support plate 710 and/or between the first layer 320 and the support plate. For example, the adhesive members 730 may include a pressure sensitive adhesive (PSA).

For example, the support plate 710 may support the first display region 311 by being disposed below a first polymer film 3111 of the first display region 311. The support plate 710 may include the lattice portion 710a for a folded state of a foldable electronic device 101. The lattice portion 710a may include a lattice structure formed by a plurality of openings and/or a plurality of recesses. For example, when the foldable electronic device 101 is in the folded state, the support plate 710 may be bent by the lattice portion 710a.

For example, the step compensation film 720 may be disposed in the gap to compensate for the gap formed for the folded state. For example, as illustrated in FIGS. 7A and 7B, the step compensation film 720 may be disposed in a gap between the adhesive members 730, but is not limited thereto. The step compensation film 720 may have flexibility. In addition, the plurality of layers may include various components.

Referring to FIG. 7A, a shielding member (e.g., the shielding member 331 of FIG. 7B) may be omitted in a position spaced apart from a first magnet (e.g., a first magnet M1 of FIG. 7B) and a second magnet (e.g., a second magnet M2 of FIG. 7B). Since the shielding member 331 is a component for reducing interference between the first magnet M1 and the second magnet M2 and the electromagnetic induction panel 321, the shielding member 331 may be omitted in a position spaced apart from the first magnet M1 and the second magnet M2. For example, the first layer 320 may further include a conductive sheet 322. The conductive sheet 322 may be attached to the electromagnetic induction panel 321, below the electromagnetic induction panel 321. For example, the conductive sheet 322 may reduce electromagnetic waves transmitted from the inside of the foldable electronic device 101 to the electromagnetic induction panel 321 and/or electromagnetic waves transmitted from an external electronic device (e.g., an electronic pen and/or a stylus pen) to the inside of the foldable electronic device 101. For example, the conductive sheet 322 may include a magnetic metal powder (MMP). For example, the magnetic metal powder may include iron, aluminum, nickel, and/or silicon, but is not limited thereto. For example, the second layer 330 disposed below the first layer 320 may be in contact with the conductive sheet 322. For example, since the electromagnetic induction panel 321 is rigid, the electromagnetic induction panel 321 may include a first electromagnetic induction panel 321a and a second electromagnetic induction panel 321b that are separated for the folded state of the foldable electronic device 101. For example, the first electromagnetic induction panel 321a may be disposed in the first housing part 210, and the second electromagnetic induction panel 321b may be disposed in the second housing part 220. The first electromagnetic induction panel 321a and the second electromagnetic induction panel 321b may be spaced apart from each other with a folding axis f interposed therebetween.

For example, the first layer 320 may further include a reinforcing member 323. For example, the reinforcing member 323 may be disposed below the electromagnetic induction panel 321. For example, the reinforcing member 323 may be rigid. The rigid reinforcing member 323 may support the first display region 311. In case that the conductive sheet 322 is included in the first layer 320, the reinforcing member 323 may be disposed below the conductive sheet 322. Since the reinforcing member 323 is rigid, the reinforcing member 323 may include a first reinforcing member 323a and a second reinforcing member 323b that are separated for the folded state of the foldable electronic device 101. For example, the first reinforcing member 323a may be disposed in the first housing part 210, and the second reinforcing member 323b may be disposed in the second housing part 220. The first reinforcing member 323a and the second reinforcing member 323b may be spaced apart from each other with the folding axis f interposed therebetween. For example, the reinforcing member 323 may be omitted.

For example, the foldable electronic device 101 may include waterproof structures that provide waterproof spaces. For example, the foldable electronic device 101 may include a first waterproof tape 411 that forms a first waterproof structure 410. For example, the foldable electronic device 101 may include a second waterproof tape 421, a third waterproof tape 422, and a resin part (e.g., the resin part 423 of FIG. 4) forming a second waterproof structure 420. The waterproof structures may reduce the inflow of moisture and/or foreign substance between the display device 300 and a first frame 215 and between the display device 300 and a second frame 227. For example, the first waterproof tape 411 having a closed loop shape may be attached to the first layer 320 and the first frame 215. For example, the second waterproof tape 421 may be attached to the second display region 312 and the second frame 227. For example, the third waterproof tape 422 may be attached to the first layer 320 and the second frame 227. For example, a cushion 740 may be disposed in a first waterproof space S1 and a second waterproof space S2. The cushion 740 may reduce damage to the display device 300 by absorbing an external impact. The above-described waterproof tapes (e.g., the first waterproof tape 411, the second waterproof tape 421, and the third waterproof tape 422) may be distinct from a waterproof member (e.g., the waterproof member 332 of FIG. 7B) in the second layer 330 as the display device 300 is attached to the first frame 215 and/or the second frame 227.

Referring to FIG. 7B, the second layer 330 may include the shielding member 331 in a position overlapping the first magnet M1 and the second magnet M2. For example, the second layer 330 may be disposed between the first layer 320 and the second display region 312. For example, the second layer 330 may be in contact with the first layer 320 and the second display region 312.

For example, the shielding member 331 may be disposed above the second magnet M2 (e.g., +z direction). For example, when the display device 300 is viewed from above (e.g., when viewed in the −z direction), the second magnet M2 may overlap the shielding member 331. The size of the shielding member 331 may correspond to the size of the second magnet M2 or may be larger than the size of the second magnet M2. The shielding member 331 may reduce the influence of the magnetic field formed by the second magnet M2 on a portion of the electromagnetic induction panel 321 positioned above the second magnet M2. For example, the portion of the electromagnetic induction panel 321 positioned above the second magnet M2 may be a portion of the second electromagnetic induction panel 321*b* that overlaps the second magnet M2. For example, in case that the conductive sheet 322 is included in the first layer 320, the electromagnetic induction panel 321 may have a double shielding structure by the conductive sheet 322 and the shielding member 331. For example, the conductive sheet 322 and the shielding member 331 may improve electromagnetic interference (EMI).

For example, since the second display region 312 is not included in the first housing part 210, another shielding member 750 may be disposed above the first magnet M1. The other shielding member 750 may be substantially the same as the shielding member 331. The other shielding member 750 may reduce interference between the first magnet M1 and the first electromagnetic induction panel 321*a*.

Referring to FIG. 7B, the thickness of the second layer 330 may be relatively thin as the shielding member 331 and the waterproof member 332 are disposed in parallel in the second layer 330. For example, in case that the shielding member 331 and the waterproof member 332 are disposed to overlap, the thickness of the second layer 330 may be determined by the thickness of the shielding member 331 and the waterproof member 332. For example, in case that the shielding member 331 is disposed above the waterproof member 332, the thickness of the second layer 330 may be relatively thick. Due to the increase in the thickness of the second layer 330, a distance between the first display region 311 and the second display region 312 may increase. As the thickness increases, the curvature of the third display region 313 may increase, and the thickness of the second frame 227 may increase. The curvature of the third display region 313 may be reduced and a thickness of the display device 300 and the foldable electronic device 101 may be reduced as the example foldable electronic device 101 includes the waterproof member 332 and the shielding member 331 disposed parallel to each other in the same layer (e.g., the second layer 330). For example, in case that the shielding member 331 is disposed parallel to the waterproof member 332, the shielding member 331 may have a relatively thick thickness compared to a case where the shielding member 331 overlaps the waterproof member 332. As the thickness of the shielding member 331 becomes relatively thick, the effect of reducing the interference between the second magnet M2 and the portion of the electromagnetic induction panel 321 may be improved.

Figure 8A:
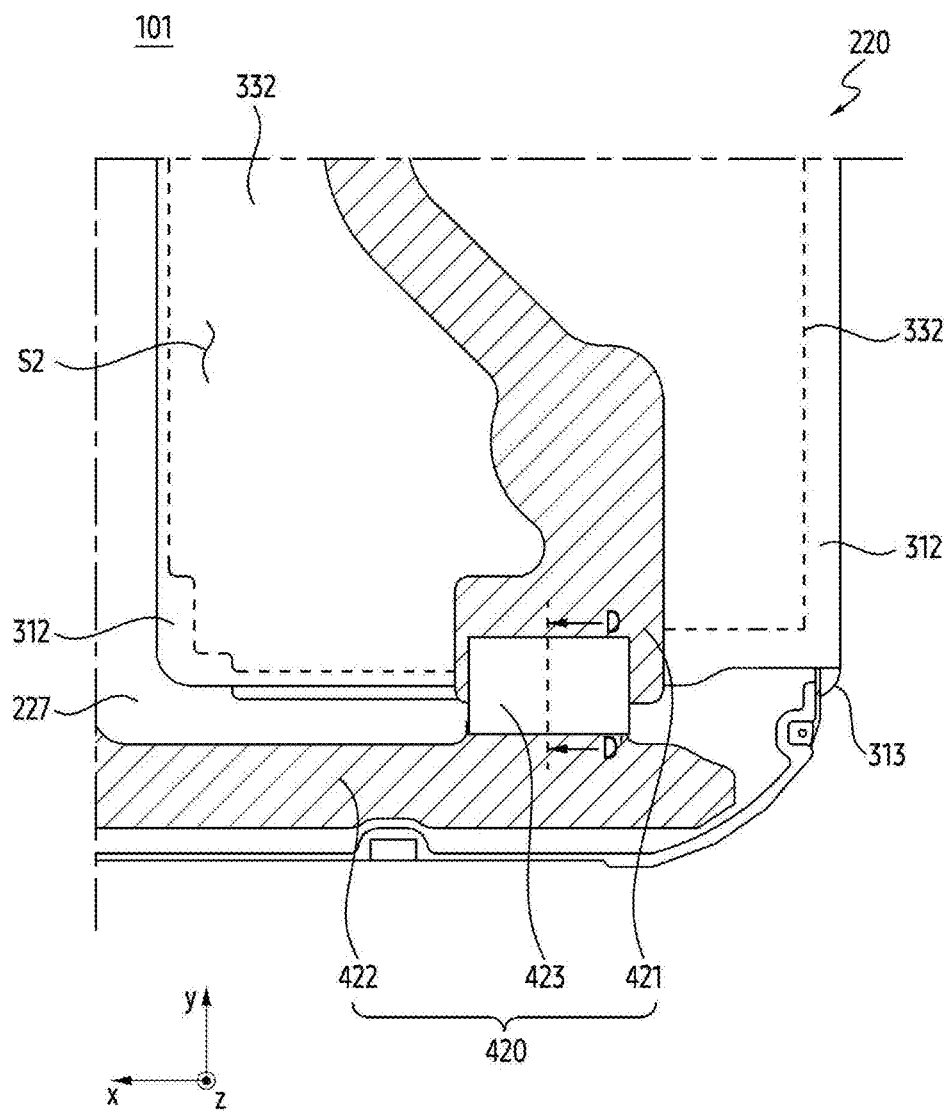
FIG. 8A is an enlarged view with respect to a portion X of FIG. 5.
Figure 8B:
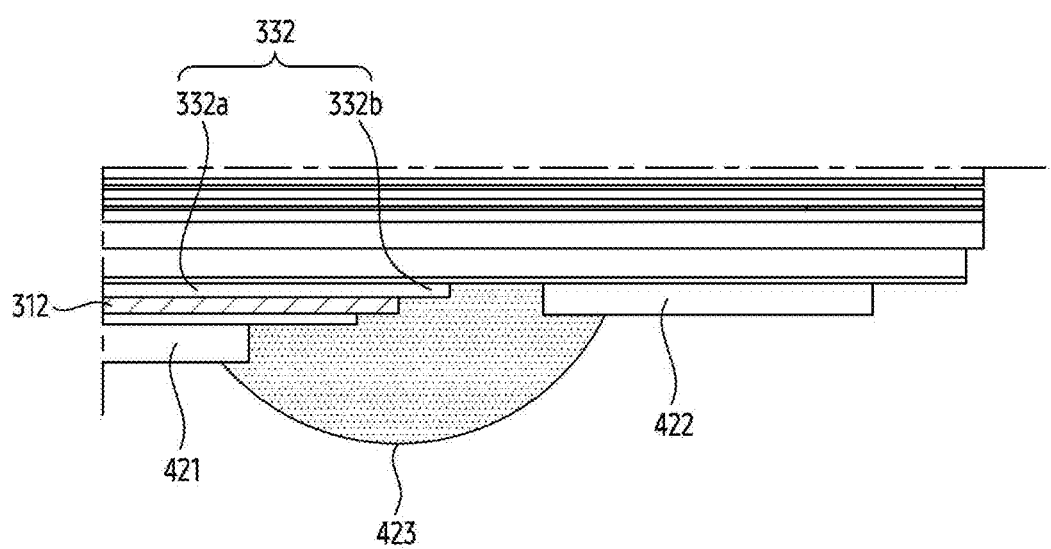
FIG. 8B is a cross-sectional view illustrating a cross section of a foldable electronic device of FIG. 8A taken along D-D' according to various embodiments.

FIG. 8A is a diagram illustrating an enlarged view with respect to a portion X of FIG. 5 according to various embodiments. FIG. 8B is a cross-sectional view illustrating a cross section of a foldable electronic device of FIG. 8A taken along D-D' according to various embodiments.

Referring to FIG. 8A, a second display region 312 may extend from a third display region 313 to a point in a second housing part 220. For example, the second display region 312 may not extend to a first housing part 210 beyond a hinge structure (e.g., the hinge structure 250 of FIG. 2C), but may be disposed only in the second housing part 220. A step may be formed between a front surface of a second frame 227 and the second display region 312 due to a thickness of the second display region 312.

For example, a second waterproof structure 420 may form a second waterproof space S2. For example, the second waterproof structure 420 may include a second waterproof tape 421, a third waterproof tape 422, and a resin part 423. The second waterproof tape 421 and the third waterproof tape 422 may be spaced apart from each other without being connected to each other due to the step. In case of connecting the second waterproof tape 421 and the third waterproof tape 422, a wrinkle may be formed due to the step. A gap between the front surface of the second frame 227 and the second waterproof structure 420 may be formed by the wrinkle. Damage to a flexible display 310 may be caused by moisture and/or foreign substance flowing into the second waterproof space S2 through the gap.

For example, the second waterproof structure 420 may include the resin part 423 for filling a gap between the second waterproof tape 421 and the third waterproof tape 422. For example, a waterproof member 332 may include a portion protruding outside the second display region 312. For example, the waterproof member 332 may include a first portion 332*a* in contact with the second display region 312 and a second portion 332*b* protruding from the second display region 312. Referring to FIG. 8B, the resin part 423 may be formed between the second waterproof tape 421 and the third waterproof tape 422. For example, the resin part 423 may be referred to as a scaling member or sealant for filling the gap and reducing leakage of the second waterproof space S2. For example, the resin part 423 may cover the second portion 332*b* protruding from the second display region 312. The second portion 332*b* protruding from the second display region 312 may reduce that a material before curing flows into the flexible display 310 in a process of forming the resin part 423. For example, the resin part 423 may include butyl rubber, ethylene propylene diene monomer (EPDM), and/or cured-in place gasket (CIPG) including polyurethane. The second waterproof structure 420 may have a closed loop shape formed by the second waterproof tape 421, the third waterproof tape 422, and the resin part 423. Damage to the flexible display 310 may be reduced by forming the second waterproof space S2 by the second waterproof structure 420 having the closed loop shape.

Figure 9:
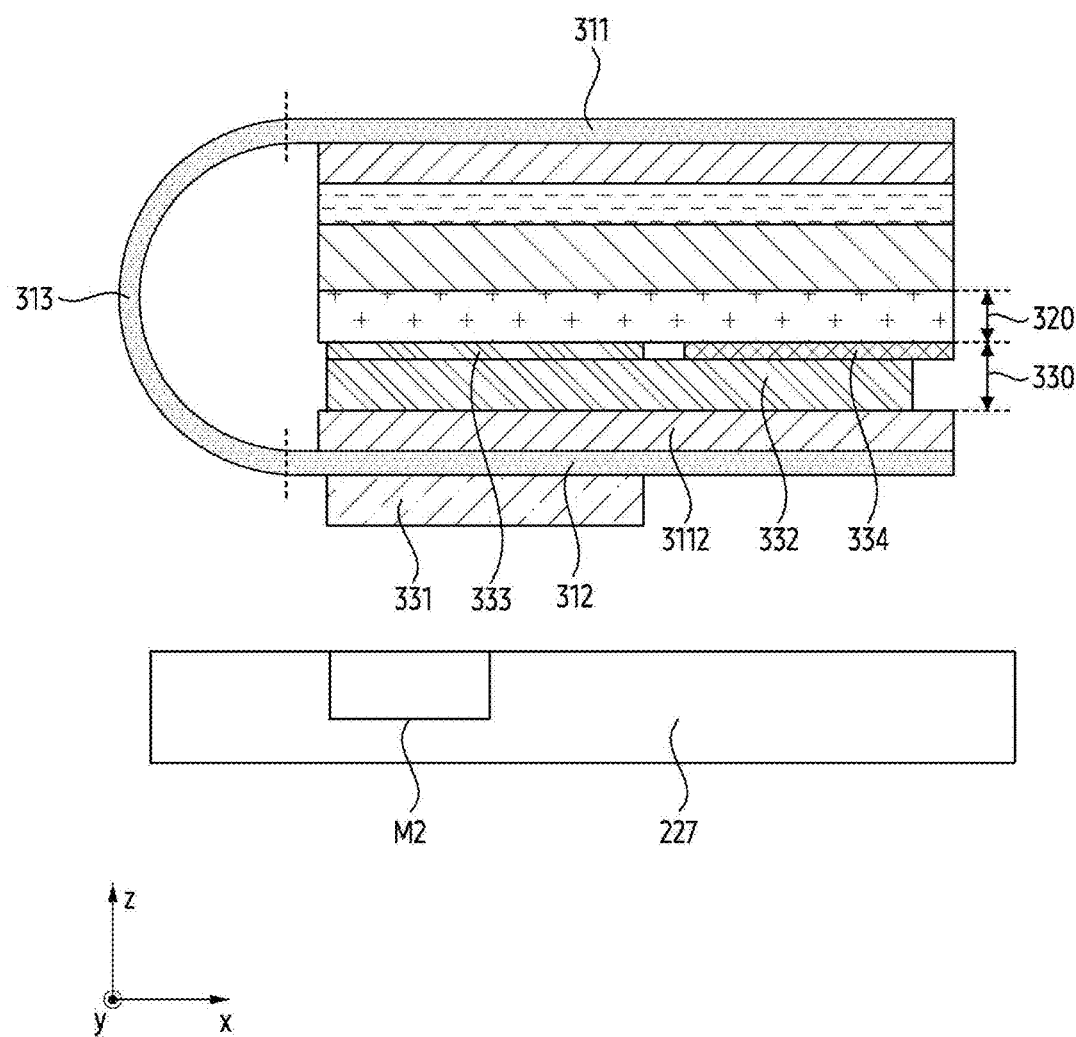
FIG. 9 is a diagram illustrating an enlarged view with respect to a portion of a display device according to various embodiments.

FIG. 9 is an enlarged cross-sectional view with respect to a portion of a display device according to various embodiments.

Referring to FIG. 9, a second layer 330 may include a waterproof member 332. For example, the waterproof member 332 may be disposed on a second polymer film 3112.

For example, a shielding member 331 may be disposed between a second magnet M2 and a portion of a second display region 312 positioned above the second magnet M2 (e.g., +Z direction). Compared to the structure illustrated in FIG. 6B, in a structure illustrated in FIG. 9, the shielding member 331 may be disposed outside the second display region 312.

For example, since the shielding member 331 is not disposed in the second layer 330, but is disposed between the second display region 312 and the second magnet M2, a thickness of the second layer 330 may be reduced. For example, a thickness of the waterproof member 332 may be about 80 μm to 100 μm. For example, a thickness of an adhesive member 333 for attaching the waterproof member 332 to a first layer 320 (e.g., the electromagnetic induction panel 321) may be about 20 μm to 30 μm. For example, a thickness of a support 334 interposed between the first layer 320 and the waterproof member 332 may be about 20 μm to 30 μm. The thickness of the second layer 330 may be about 100 μm to 130 μm. Since the thickness of the second layer 330 illustrated in FIG. 6B is about 107 μm, the thickness of the second layer 330 may be relatively thin as the shielding member 331 is disposed outside the second display region 312. Since the thickness of the second layer 330 becomes relatively thin, the curvature of a third display region 313 may decrease, and a thickness of a display device 300 and a foldable electronic device 101 may decrease. The shielding member 331 may be fixed by being attached to the second display region 312, below the second display region 312. The shielding member 331 may not be attached to a second frame 227, but is not limited thereto.

According to an example embodiment, a foldable electronic device is provided. The foldable electronic device may comprise a housing, a flexible display, a first layer, a second layer, a first magnet, and a second magnet. The housing may include a first housing part and a second housing part configured to be rotatable with respect to the first housing part, about a folding axis. The flexible display may include a first display region, a second display region, and a third display region. The first display region may include an active area forming at least a portion of a front surface of the housing. The second display region may be opposite to the first display region. The second display region may be spaced apart from the first display region. The third display region may connect the first display region and the second display region. The third display region may be bent. The first layer may include an electromagnetic induction panel disposed below the first display region. The second layer may be in contact with the second display region between the first layer and the second display region. The first magnet may be disposed below the flexible display. The first magnet may be disposed in the first housing part. The second magnet may be disposed below the flexible display. The second magnet may be paired with the first magnet. The first and second magnets may be configured to maintain a folded state of the foldable electronic device. The second layer may include a shielding member comprising a sheet (e.g., a shielding sheet) and a waterproof member comprising a waterproof material. The shielding member may be disposed between the second magnet and a portion of the electromagnetic induction panel positioned above the second magnet. The waterproof member may at least partially surround the shielding member.

For example, a first surface of the second layer facing the first display region may be in contact with the first layer. A second surface of the second layer facing the second display region may be in contact with the second display region.

For example, the second display region may include a polymer film in contact with the second layer. The second layer may further include an adhesive member comprising an adhesive material configured to attach the shielding member to the polymer film.

For example, the second layer may further include a support interposed between the first layer and the waterproof member.

For example, the shielding member may be disposed on substantially the same plane as the waterproof member in the second layer.

For example, the third display region may extend from an end of the first display region included in the second housing part to an end of the second display region in the second housing part. The second display region may extend from the end of the second display region to a point in the second housing part.

For example, the waterproof member may include a first portion in contact with the second display region, and a second portion protruding from the second display region.

For example, the foldable electronic device may further comprise a first frame disposed in the first housing part and configured to support a portion of the flexible display, a second frame disposed in the second housing part and configured to support another portion of the flexible display, a first waterproof structure comprising a waterproof material forming a first waterproof space between the portion of the flexible display and the first frame, and a second waterproof structure comprising a waterproof material forming a second waterproof space between the other portion of the flexible display and the second frame.

For example, the first waterproof structure may include a first waterproof tape. The first waterproof tape may be configured to attach the portion of the flexible display on the first frame. The first waterproof tape may have a closed loop shape. The second waterproof structure may include a second waterproof tape configured to attach the second display region on the second frame, a third waterproof tape configured to attach the first display region on the second frame, and a resin part comprising a resin configured to fill a gap between the second waterproof tape and the third waterproof tape.

For example, the first magnet may be included in the first frame. The second magnet may be included in the second frame.

For example, the electromagnetic induction panel of the first layer may include a first electromagnetic induction panel disposed in the first housing part, and a second electromagnetic induction panel disposed in the second housing part. A portion of the electromagnetic induction panel positioned above the second magnet may be a portion of the second electromagnetic induction panel. The foldable electronic device may further comprise another shielding member comprising a shielding sheet disposed between the first magnet and a portion of the first electromagnetic induction panel positioned above the first magnet.

For example, the foldable electronic device may further comprise display driver integrated circuitry disposed in the second housing part. The second display region may be electrically connected to the display driver integrated circuitry.

For example, the first layer may further include a conductive sheet attached to the electromagnetic induction panel below the electromagnetic induction panel. The second layer may be in contact with the conductive sheet.

For example, the first layer may further include a reinforcing member comprising a rigid layer disposed below the electromagnetic induction panel, and configured to support the first display region. The second layer may be in contact with the reinforcing member. The housing may further include a hinge structure comprising a hinge. The hinge structure be configured to enable the foldable electronic device to be in the folded state, an unfolded state, and an intermediate state between the folded state and the unfolded state by rotatably connecting the first housing part and the second housing part.

According to an example embodiment, a display device is provided. The display device may comprise a flexible display, a first layer, and a second layer. The flexible display may include a first display region, a second display region, and a third display region. The first display region may include a plurality of pixels. The second display region may be opposite to the first display region. The second display region may be spaced apart from the first display region. The third display region may connect the first display region and the second display region. The third display region may be bent. The first layer may include an electromagnetic induction panel disposed below the first display region. The second layer may be in contact with the second display region between the first layer and the second display region. The second layer may include a shielding member comprising a sheet (e.g., a shielding sheet) disposed below the electromagnetic induction panel, and a waterproof member comprising a waterproof material at least partially surrounding the shielding member.

For example, a first surface of the second layer facing the first display region may be in contact with the first layer. A second surface of the second layer facing the second display region may be in contact with the second layer.

For example, the second display region may include a polymer film in contact with the second layer. The second layer may further include an adhesive member comprising an adhesive material configured to attach the shielding member to the polymer film.

For example, the display device may further comprise display driver integrated circuitry configured to control the display. The second display region may be electrically connected to the display driver integrated circuitry.

For example, a size of the first display region may be larger than a size of the second display region.

According to an example embodiment, a foldable electronic device is provided. The foldable electronic device may comprise a housing, a flexible display, a first magnet, a second magnet, an electromagnetic induction panel, a waterproof member comprising a waterproof material, and a shielding member comprising a sheet (e.g., a shielding sheet). The housing may include a first housing part and a second housing part configured to be rotatable with respect to the first housing part, about a folding axis. The flexible display may include a first display region, a second display region, and a third display region. The first display region may include an active area forming at least a portion of a front surface of the housing. The second display region may be opposite to the first display region. The second display region may be spaced apart from the first display region. The third display region may connect the first display region and the second display region. The first magnet may be disposed below the flexible display. The first magnet may be disposed in the first housing part. The second magnet may be disposed below the flexible display. The second magnet may be paired with the first magnet. The first and second magnets be and configured to maintain a folded state of the foldable electronic device. The electromagnetic induction panel may be disposed below the first display region. The waterproof member may be in contact with the second display region between the electromagnetic induction panel and the second display region. The shielding member may be disposed between the second magnet and a portion of the second display region positioned above the second magnet.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means."

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A foldable electronic device comprising:
   a housing including a first housing part and a second housing part configured to be rotatable with respect to the first housing part;
   a flexible display including:
      a first display region including an active area forming at least a portion of a front surface of the housing,
      a second display region opposite to the first display region and spaced apart from the first display region, and
      a third display region connecting the first display region and the second display region, and is bent;
   a first layer including an electromagnetic induction panel disposed below the first display region;
   a second layer in contact with the second display region between the first layer and the second display region;
   a first magnet in the first housing part disposed below the flexible display; and
   a second magnet in the second housing part disposed below the flexible display and paired with the first magnet, the first and second magnets configured to maintain a folded state of the foldable electronic device,
   wherein the second layer includes:
      a shielding member comprising a sheet disposed between the second magnet and a portion of the electromagnetic induction panel positioned above the second magnet, and
      a waterproof member comprising a waterproof material and at least partially surrounding the shielding member.

2. The foldable electronic device of claim 1,
   wherein a first surface of the second layer facing the first display region is in contact with the first layer, and
   wherein a second surface of the second layer facing the second display region is in contact with the second display region.

3. The foldable electronic device of claim 2,
   wherein the second display region includes a polymer film in contact with the second layer, and
   wherein the second layer further includes an adhesive member comprising an adhesive material configured to attach the shielding member to the polymer film.

4. The foldable electronic device of claim 2,
   wherein the second layer further includes a support interposed between the first layer and the waterproof member.

5. The foldable electronic device of claim 1,
   wherein the shielding member is disposed on substantially a same plane as the waterproof member in the second layer.

6. The foldable electronic device of claim 1,
   wherein the third display region extends from an end of the first display region included in the second housing part to an end of the second display region in the second housing part, and
   wherein the second display region extends from the end of the second display region to a point in the second housing part.

7. The foldable electronic device of claim 6,
   wherein the waterproof member includes a first portion in contact with the second display region, and a second portion protruding from the second display region.

8. The foldable electronic device of claim 1, further comprising:
   a first frame disposed in the first housing part and configured to support a portion of the flexible display;
   a second frame disposed in the second housing part and configured to support another portion of the flexible display;
   a first waterproof structure comprising a waterproof material forming a first waterproof space between the portion of the flexible display and the first frame, and
   a second waterproof structure comprising a waterproof material forming a second waterproof space between the other portion of the flexible display and the second frame.

9. The foldable electronic device of claim 8,
   wherein the first waterproof structure includes a first waterproof tape configured to attach the portion of the flexible display on the first frame and having a closed loop shape, and
   wherein the second waterproof structure includes:
      a second waterproof tape configured to attach the second display region on the second frame,
      a third waterproof tape configured to attach the first display region on the second frame, and
      a resin part comprising a resin configured to fill a gap between the second waterproof tape and the third waterproof tape.

10. The foldable electronic device of claim 8,
    wherein the first magnet is included in the first frame, and
    wherein the second magnet is included in the second frame.

11. The foldable electronic device of claim 1,
    wherein the electromagnetic induction panel of the first layer includes:
       a first electromagnetic induction panel disposed in the first housing part, and
       a second electromagnetic induction panel disposed in the second housing part, wherein the portion of the electromagnetic induction panel positioned above the second magnet is a portion of the second electromagnetic induction panel, and wherein the foldable electronic device further comprises another shielding member comprising a sheet disposed between the first magnet and a portion of the first electromagnetic induction panel positioned above the first magnet.

12. The foldable electronic device of claim 1, further comprising display driver integrated circuitry disposed in the second housing part, and wherein the second display region is electrically connected to the display driver integrated circuitry.

13. The foldable electronic device of claim 1, wherein the first layer further includes a conductive sheet attached to the electromagnetic induction panel below the electromagnetic induction panel, and wherein the second layer is in contact with the conductive sheet.

14. The foldable electronic device of claim 1, wherein the first layer further includes a reinforcing member comprising a rigid layer disposed below the electromagnetic induction panel, and configured to support the first display region, and wherein the second layer is in contact with the reinforcing member.

15. The foldable electronic device of claim 1, wherein the housing further includes a hinge structure comprising a hinge configured to provide the folded state of the foldable electronic device, an unfolded state of the foldable electronic device, and an intermediate state of the foldable electronic device between the folded state and the unfolded state by rotatably connecting the first housing part and the second housing part.

16. A display device comprising:

a flexible display, the flexible display including:

a first display region including a plurality of pixels, a second display region opposite to the first display region and spaced apart from the first display region, and a third display region connecting the first display region and the second display region, and is bent;

a first layer including an electromagnetic induction panel disposed below the first display region; and a second layer in contact with the second display region between the first layer and the second display region, wherein the second layer includes:

a shielding member comprising a sheet disposed below the electromagnetic induction panel, and a waterproof member comprising a waterproof material and at least partially surrounding the shielding member.

17. The display device of claim 16, wherein a first surface of the second layer facing the first display region is in contact with the first layer, and wherein a second surface of the second layer facing the second display region is in contact with the second layer.

18. The display device of claim 17, wherein the second display region includes a polymer film in contact with the second layer, and wherein the second layer further includes an adhesive member comprising an adhesive material configured to attach the shielding member to the polymer film.

19. The display device of claim 16, further comprising display driver integrated circuitry configured to control the display, wherein the display driver integrated circuitry is electrically connected to the second display region.

20. The display device of claim 16, wherein a size of the first display region is larger than a size of the second display region.

* * * * *